(12) United States Patent
Braun

(10) Patent No.: US 10,210,346 B2
(45) Date of Patent: *Feb. 19, 2019

(54) SYSTEM FOR AND METHOD OF CONTROLLABLY DISCLOSING SENSITIVE DATA

(71) Applicant: SybilSecurity IP LLC, Cambridge, MA (US)

(72) Inventor: Uri Jacob Braun, Cambridge, MA (US)

(73) Assignee: SYBILSECURITY IP LLC, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,500

(22) Filed: Jul. 14, 2017

(65) Prior Publication Data

US 2017/0337398 A1    Nov. 23, 2017

Related U.S. Application Data

(63) Continuation of application No. 14/848,300, filed on Sep. 8, 2015, now Pat. No. 9,710,672.

(60) Provisional application No. 62/047,430, filed on Sep. 8, 2014.

(51) Int. Cl.
*G06F 21/62* (2013.01)

(52) U.S. Cl.
CPC .. *G06F 21/6254* (2013.01); *G06F 2221/2101* (2013.01)

(58) Field of Classification Search
CPC ............ G06F 21/6254; G06F 2221/2101
See application file for complete search history.

(56) References Cited

U.S. PATENT DOCUMENTS

| 5,131,186 A | 7/1992 | Lamont |
| 5,164,988 A | 11/1992 | Matyas |
| 5,513,354 A | 4/1996 | Dwork |

(Continued)

OTHER PUBLICATIONS

Koudas et al. "Distribution-Based Microdata Anintmization." VLDA (2009).

(Continued)

*Primary Examiner* — Joseph P Hirl
*Assistant Examiner* — Stephen T Gundry
(74) *Attorney, Agent, or Firm* — Burns & Levinson LLP; Jerry Cohen

(57) ABSTRACT

System and method of producing a collection of possibilities that agree on information that must be disclosed (disclosable information) and disagree with a sufficient degree of diversity as defined by a policy to protect the sensitive information. A policy defines: what information is possible, what information the recipient would believe what information is sensitive (to protect), what information is disclosable (to share) and sufficiency conditions that specify the degree of ambiguity required to consider the sensitive information protected. A formalism is utilized that provably achieves these goals for a variety of structured datasets including tabular data such as spreadsheets or databases as well as annotated graphs. The formalism includes the ability to generate a certificate that proves a disclosure adheres to a policy. This certificate is produced either as part of the protection process or separately using an altered process.

18 Claims, 22 Drawing Sheets

(56) References Cited

U.S. PATENT DOCUMENTS

| | | | |
|---|---|---|---|
| 5,539,826 A | 7/1996 | Dwork | |
| 5,682,470 A | 10/1997 | Dwork | |
| 5,926,551 A | 7/1999 | Dwork | |
| 5,978,482 A | 11/1999 | Dwork | |
| 6,081,610 A | 6/2000 | Dwork | |
| 6,126,203 A | 10/2000 | Dwork | |
| 6,658,568 B1* | 12/2003 | Ginter | G06F 21/10 348/E5.006 |
| 7,069,427 B2 | 6/2006 | Adler | |
| 7,188,106 B2 | 3/2007 | Dwork | |
| 7,237,116 B1 | 6/2007 | Dwork | |
| 7,269,578 B2 | 9/2007 | Sweeney | |
| 7,363,192 B2 | 4/2008 | Dwork | |
| 7,552,176 B2 | 6/2009 | Atkinson | |
| 7,562,071 B2 | 7/2009 | Dwork | |
| 7,653,615 B2 | 1/2010 | Dwork | |
| 7,676,454 B2 | 3/2010 | Dwork | |
| 7,698,250 B2 | 4/2010 | Dwork | |
| 7,765,499 B2 | 7/2010 | De Graeve | |
| 7,769,707 B2 | 8/2010 | Dwork | |
| 7,797,725 B2 | 9/2010 | Lunt | |
| 7,810,142 B2 | 10/2010 | Agrawal | |
| 7,814,534 B2 | 10/2010 | Dillaway | |
| 7,818,335 B2 | 10/2010 | Dwork | |
| 7,921,173 B2 | 4/2011 | Atkinson | |
| 7,975,308 B1* | 7/2011 | Satish | G06F 17/30867 713/152 |
| 8,005,821 B2 | 8/2011 | Dwork | |
| 8,060,931 B2* | 11/2011 | Dillaway | G06F 21/6218 726/10 |
| 8,170,957 B2* | 5/2012 | Richard | G06F 21/6245 705/51 |
| 8,200,760 B2 | 6/2012 | Jacobs | |
| 8,225,378 B2 | 7/2012 | Dillaway | |
| 8,239,682 B2 | 8/2012 | Meehan | |
| 8,312,273 B2 | 11/2012 | Veradim | |
| 8,464,046 B1* | 6/2013 | Kragh | H04L 63/08 705/3 |
| 8,532,978 B1* | 9/2013 | Turner | G06F 17/271 704/10 |
| 8,577,933 B2 | 11/2013 | Evenhaim | |
| 8,655,824 B1* | 2/2014 | Allen | G06N 5/025 706/47 |
| 8,656,303 B2* | 2/2014 | Hughes, Jr. | G06F 21/51 705/14.59 |
| 8,689,281 B2* | 4/2014 | Balinsky | G06F 21/6218 707/694 |
| 8,775,402 B2 | 7/2014 | Baskerville | |
| 8,837,718 B2* | 9/2014 | Lauter | G06F 21/6209 380/278 |
| 8,838,556 B1* | 9/2014 | Reiner | G06F 17/30994 707/694 |
| 8,893,264 B2* | 11/2014 | Suominen | G06F 21/64 713/183 |
| 8,938,783 B2* | 1/2015 | Becker | G06F 21/62 726/4 |
| 8,943,079 B2 | 1/2015 | Huang | |
| 8,984,282 B1* | 3/2015 | Kragh | H04L 9/321 705/3 |
| 9,009,780 B2 | 4/2015 | Heise | |
| 9,053,297 B1* | 6/2015 | Fitch | G06F 21/34 |
| 9,083,754 B2* | 7/2015 | Lindberg | G06Q 20/02 |
| 9,224,000 B1* | 12/2015 | Ghetti | H04L 9/083 |
| 9,225,743 B1* | 12/2015 | Naik | H04L 63/20 |
| 9,251,342 B2* | 2/2016 | Becker | G06F 21/556 |
| 9,280,684 B1* | 3/2016 | Kragh | G06F 21/6227 |
| 9,317,690 B2* | 4/2016 | Sallam | G06F 21/572 |
| 9,768,962 B2* | 9/2017 | Acar | H04L 9/3226 |
| 2001/0056546 A1 | 12/2001 | Ogilvie | |
| 2005/0060584 A1* | 3/2005 | Ginter | G06F 21/10 726/4 |
| 2005/0138110 A1* | 6/2005 | Redlich | C07K 14/70575 709/201 |
| 2006/0085454 A1 | 4/2006 | Blegen | |
| 2006/0218651 A1* | 9/2006 | Ginter | G06F 21/00 726/27 |
| 2006/0277341 A1* | 12/2006 | Johnson | G06F 21/6227 710/200 |
| 2007/0113288 A1 | 5/2007 | Blunenau | |
| 2008/0066147 A1 | 3/2008 | Dillaway | |
| 2008/0115191 A1* | 5/2008 | Kim | G06F 21/6245 726/1 |
| 2008/0120240 A1* | 5/2008 | Ginter | G06F 21/10 705/51 |
| 2008/0222734 A1* | 9/2008 | Redlich | G06F 21/577 726/26 |
| 2009/0300705 A1 | 12/2009 | Dettinger | |
| 2010/0205657 A1 | 8/2010 | Manring | |
| 2010/0211907 A1* | 8/2010 | Hughes, Jr. | G06F 21/51 715/781 |
| 2010/0225443 A1* | 9/2010 | Bayram | G06F 21/316 340/5.83 |
| 2010/0246827 A1* | 9/2010 | Lauter | G06F 21/6209 380/278 |
| 2010/0257576 A1* | 10/2010 | Valente | H04L 41/0266 726/1 |
| 2011/0179286 A1* | 7/2011 | Spalka | G06F 21/6254 713/189 |
| 2011/0231645 A1* | 9/2011 | Thomas | H04L 9/321 713/150 |
| 2011/0239269 A1* | 9/2011 | Wahl | H04L 63/0815 726/1 |
| 2011/0277036 A1* | 11/2011 | Nilsson | H04W 4/185 726/26 |
| 2011/0307724 A1* | 12/2011 | Shaw | G06F 21/305 713/323 |
| 2012/0063593 A1* | 3/2012 | Camenisch | H04L 9/3073 380/44 |
| 2012/0255010 A1* | 10/2012 | Sallam | G06F 21/572 726/24 |
| 2013/0031596 A1* | 1/2013 | Becker | G06F 21/556 726/1 |
| 2013/0111544 A1* | 5/2013 | Balinsky | G06F 21/6218 726/1 |
| 2013/0254255 A1* | 9/2013 | Nilsson | H04L 67/10 709/201 |
| 2013/0312084 A1* | 11/2013 | Tandon | G06F 21/00 726/17 |
| 2013/0318630 A1* | 11/2013 | Lam | G06F 21/60 726/28 |
| 2013/0326641 A1 | 12/2013 | Minaguchi et al. | |
| 2014/0013297 A1* | 1/2014 | Cook | G06F 8/33 717/105 |
| 2014/0047501 A1* | 2/2014 | Rissanen | G06F 21/00 726/1 |
| 2014/0119540 A1* | 5/2014 | Pearson | H04L 9/0825 380/44 |
| 2014/0164776 A1* | 6/2014 | Hook | H04L 9/14 713/171 |
| 2014/0195818 A1* | 7/2014 | Neumann | G06F 21/6209 713/189 |
| 2014/0201520 A1* | 7/2014 | Yacobi | H04L 9/3073 713/158 |
| 2014/0201804 A1* | 7/2014 | Uthmani | G06F 21/60 726/1 |
| 2014/0208437 A1 | 7/2014 | Sasaki | |
| 2014/0281491 A1* | 9/2014 | Zaverucha | H04L 9/321 713/155 |
| 2014/0281525 A1* | 9/2014 | Acar | H04L 9/3213 713/168 |
| 2014/0282837 A1* | 9/2014 | Heise | G06F 21/6245 726/1 |
| 2014/0283016 A1* | 9/2014 | Sambamurthy | G06F 21/31 726/19 |
| 2014/0289789 A1* | 9/2014 | Poornachandran | G06F 21/6245 726/1 |
| 2014/0304787 A1* | 10/2014 | Kurien | G06Q 10/1053 726/6 |

(56) References Cited

U.S. PATENT DOCUMENTS

| | | | | |
|---|---|---|---|---|
| 2014/0365527 | A1* | 12/2014 | Fuchs | G06F 21/6227 707/786 |
| 2015/0095971 | A1* | 4/2015 | Roffe | G06F 21/445 726/1 |
| 2015/0242648 | A1* | 8/2015 | Lemmey | G06F 21/6218 726/30 |
| 2015/0244690 | A1* | 8/2015 | Mossbarger | H04L 63/061 713/171 |
| 2015/0295939 | A1* | 10/2015 | Rissanen | G06F 21/62 726/1 |
| 2015/0317490 | A1* | 11/2015 | Carey | G06F 19/28 726/26 |
| 2015/0326399 | A1* | 11/2015 | Nigriny | H04L 9/3263 713/156 |
| 2016/0042197 | A1* | 2/2016 | Gkoulalas-Divanis | G06F 17/30165 707/781 |
| 2016/0048696 | A1* | 2/2016 | Follis | G06F 21/6209 726/28 |
| 2016/0239682 | A1* | 8/2016 | Kapadia | G06F 17/30256 |
| 2017/0011077 | A1* | 1/2017 | Kypreos | G06Q 40/00 |
| 2017/0039376 | A1* | 2/2017 | Skipper | G06F 21/6209 |
| 2017/0063553 | A1* | 3/2017 | Saxena | H04L 9/3247 |
| 2017/0116035 | A1* | 4/2017 | Nilsson | G06F 9/5011 |

OTHER PUBLICATIONS

Sweeney "Achieving k-Anonymity Privacy Protection Using Generalization and Suppression" Int. J. Uncert., Fuzz. and Knowl.-based Sys. 10(5):571-588 (2002).

Sweeney "k-Anonymity: A Model for Protection Privacy" Int. J. Uncert., Fuzz. and Knowl.-based Sys. 10(5):557-570 (2002).

Rivest "Chaffing and Winnowing: Confidentiality without Encryption" retrieved from the Internet <http://theory.ios.mit.edu/-rivest/chaffing.txt.

Samarati et al. "Protecting Privacy when Disclosing Information: k-Anonymity and its Enforcement through Generalization an Suppression" IEEE Symposium on Research in Security and Privacy, May 1998.

International Search Report and Written opinion in corresponding PCT International Application No. PCT/US2015/049034, dated Dec. 4, 2015.

* cited by examiner

| Name 706 | Age 708 | Eye color 710 | Hair color 712 |
|---|---|---|---|
| Mandy — 702 | 23 | Brown | Blonde |
| Nick — 704 | 26 | Blue | Brown |

| Name 706 | Age 708 | Eye color 710 | Hair color 712 |
|---|---|---|---|
| Mandy | 23 | Brown } 714A | Blonde |
| Mandy | 23 | Blue | Blonde |
| Nick | 26 | Blue } 714B | Brown |
| Nick | 26 | Brown | Brown |

A graph G consist of a triple (V, E, M) where:

288 — • V is a set of vertices
290 — • E ⊆ V x V x L is a set of edges consisting of: one source vertex, one destination vertex, and one edge label
292 — • M ∈ V → A is a function that associates each vertex with one attribute 288 — $Set_V$ ::= $x, (x \in v)$ — 288A
　　　　　| sources $(Set_E)$ — 288B
　　　　　| targets $(Set_E)$ — 288C
　　　　　| $Set_V \cup Set_V$
　　　　　| $Set_V \cap Set_V$
　　　　　| $All_V$ — 288D 290 $Set_E$ ::= $y, (y \in \varepsilon)$ — 290A
　　　　| ins $(Set_V)$ — 290B
　　　　| outs $(Set_V)$ — 290C
　　　　| $Set_E \cup Set_E$
　　　　| $Set_E \cap Set_E$
　　　　| $All_E$ — 290D 292 — $Set_A$ ::= $\{a_1, \cdots, a_n\}, (a_i \in A)$ — 292A
　　　　　| attrs $(Set_V)$ — 292B
　　　　　| $Set_A \cup Set_A$
　　　　　| $Set_A \cap Set_A$ 294 $Set_L$ ::= $\{l_1, \cdots, l_n\}, (l_i \in L)$ — 294A
　　　　| labels $(Set_E)$ — 294B
　　　　| $Set_L \cup Set_L$
　　　　| $Set_L \cap Set_L$ FIG. 14　Syntax for defining sets in the constraint language $$c \;::=\; Set_i \subseteq Set_i \qquad i \in \{V, E, A, L\}$$
$$\;|\; n_{min} \leq |Set_i| \leq n_{max}$$

Where $Set_i$ denotes one of the sets defined above

FIG. 15　Syntax for two constraint rules $$\sigma_V, \sigma_E, G \vDash n_{min} \leq |S| \leq n_{max} \quad \text{iff } n_{min} \leq |[[S]] | \sigma_V \sigma_E, G| \leq n_{max}$$

$$\sigma_V, \sigma_E, G \vDash S_1 \subseteq S_2 \quad \text{iff } [[S_1]] | \sigma_V \sigma_E, G \subseteq [[S_2]] | \sigma_V \sigma_E, G$$

FIG. 16　Definition of satisfies $\sigma V, \sigma E, G \vDash c$.

$$[\![x]\!]_{\sigma V, \sigma E,}^{G} = \sigma_V(x) \text{ if } x \in v$$
$$[\![y]\!]_{\sigma V, \sigma E,}^{G} = \sigma_E(y) \text{ if } y \in \varepsilon$$

$$[\![sources(A)]\!]_{\sigma V, \sigma E,}^{G} = \{s \mid (s, t, l) \in [\![A]\!]_{\sigma V, \sigma E,}^{G}\}$$
$$[\![targets(A)]\!]_{\sigma V, \sigma E,}^{G} = \{t \mid (s, t, l) \in [\![A]\!]_{\sigma V, \sigma E,}^{G}\}$$

$$[\![A \cup B]\!]_{\sigma V, \sigma E,}^{G} = [\![A]\!]_{\sigma V, \sigma E,}^{G} \cup [\![B]\!]_{\sigma V, \sigma E,}^{G}$$
$$[\![A \cap B]\!]_{\sigma V, \sigma E,}^{G} = [\![A]\!]_{\sigma V, \sigma E,}^{G} \cap [\![B]\!]_{\sigma V, \sigma E,}^{G}$$

$$[\![All_V]\!]_{\sigma V, \sigma E,}^{G} = V$$
$$[\![All_E]\!]_{\sigma V, \sigma E,}^{G} = E$$

$$[\![ins(A)]\!]_{\sigma V, \sigma E,}^{G} = \{(s, n, l) \in E \mid n \in [\![A]\!]_{\sigma V, \sigma E,}^{G}\}$$
$$[\![outs(A)]\!]_{\sigma V, \sigma E,}^{G} = \{(n, t, l) \in E \mid n \in [\![A]\!]_{\sigma V, \sigma E,}^{G}\}$$

$$[\![attrs(A)]\!]_{\sigma V, \sigma E,}^{G} = \{M(n) \mid n \in [\![A]\!]_{\sigma V, \sigma E,}^{G}\}$$
$$[\![(a_1, ..., a_n)]\!]_{\sigma V, \sigma E,}^{G} = \{a_1, \cdots, a_n\}$$

$$[\![labels(A)]\!]_{\sigma V, \sigma E,}^{G} = \{l \mid (s, t, l) \in [\![A]\!]_{\sigma V, \sigma E,}^{G}\}$$
$$[\![(l_1, ..., l_n)]\!]_{\sigma V, \sigma E,}^{G} = \{l_1, \cdots, l_n\}$$

FIG. 17 Semantics for Set Expressions, where G=(V,E,M).

| Policy | Comments |
|---|---|
| vMandy = 1<br>vNick = 1 | The variable Mandy refers to one entity (person)<br>The variable Nick refers to one entity (person) |
| attrs(vMandy) = {"Mandy"}<br>attrs(vNick) = {"Nick"} | Mandy's name is Mandy<br>Nick's name is Nick |
| labels(eAge) = {"Age"}<br>labels(eEyeColor) = {"Eye Color"}<br>labels(eHairColor) = {"Hair Color"} | Age edges are those labeled Age<br>Eye Color edges are those labeled Eye Color<br>Hair Color edges are those labeled Hair Color |
| AllE = eAge ∪ eEyeColor ∪ eHairColor | Together the Age, Eye Color and Hair Color edges form all the edges |
| eAge ∩ eEyeColor = ∅<br>eAge ∩ eHairColor = ∅<br>eAyeColor ∩ eHairColor = ∅ | There is no overlap among edges |
| vNickEyeColor =<br>targets(outs(vNick) ∩ eEyeColor))<br><br>vMandyEyeColor =<br>targets(outs(vMandy) ∩ eEyeColor)) | vNickEyeColor is reached from the node Nick by the edge EyeColor<br><br>similarly for Mandy |
| minDistinct vMandyEyeColor 2<br>minDistinct vNickEyeColor 2 | There must be two distinct values for Mandy's eye color and two distinct values for Nick's eye colors |

FIG. 18

| Result | | What is fully specified? | | | |
|---|---|---|---|---|---|
| | | A & B | A & X | A | X |
| AR | inc | | | | Nothing |
| AR | exc | | | | |
| BR | inc | | | B.inc ∪ (X.inc − A.inc) | A.inc ∪ (X.inc ∩ B.exc) |
| BR | exc | | | B.exc ∪ X.exc | B.exc ∪ X.exc |
| XR | inc | A.inc ∪ B.inc | A.inc ∪ B.inc ∪ X.inc | | A.inc ∪ B.inc ∪ X.inc |
| XR | exc | A.exc ∩ B.exc | X.exc ∪ (A.exc ∩ B.exc) | | X.exc ∪ (A.exc ∩ B.exc) |

FIG. 20

| Result | | A & B | A & X | A | X | Nothing |
|---|---|---|---|---|---|---|
| | | | | What is fully specified? | | |
| AR | inc | | | | | A.inc ∪ XR.inc |
| AR | exc | | | | | B.exc ∪ (XR.exc - B.inc) |
| BR | inc | | | B.inc ∪ XR.inc | | |
| BR | exc | | | B.exc ∪ (XR.exc - A.inc) | | |
| XR | inc | A.inc ∩ B.inc | | X.inc ∪ (A.inc ∩ B.inc) | | X.inc ∪ (A.inc ∩ B.inc) |
| XR | exc | X.unk - XR.inc | | X.exc ∪ A.exc ∪ B.exc | | X.exc ∪ A.exc ∪ B.exc |

FIG. 21

| Result | | What is fully specified? | | |
|---|---|---|---|---|
| | | All | Superset (B) | Subset (S) | Nothing |
| Superset (BR) | includes excludes unknown | | S.inc<br>S.exc ∪ B.exc<br>S.unk − B.exc | B.inc ∪ S.inc<br>B.exc<br>B.unk − S.inc | B.inc ∪ S.inc<br>B.exc<br>B.unk − S.inc |
| | card min | | max(S.min, \|S.inc\|) | $\max\left\{\begin{array}{l}S.min\\B.min\\\|BR.inc\|\end{array}\right\}$ | $\max\left\{\begin{array}{l}S.min\\B.min\\\|BR.inc\|\end{array}\right\}$ |
| | card max | | $\min\left\{\begin{array}{l}B.max\\S.max\\\|S.inc\|+\|SR.unk\|\end{array}\right\}$ | $\min\left\{\begin{array}{l}B.max\\\|BR.inc\|+\|BR.unk\|\end{array}\right\}$ | $\min\left\{\begin{array}{l}B.max\\\|BR.inc\|+\|BR.unk\|\end{array}\right\}$ |
| Subset (SR) | includes excludes unknown | | | | S.inc<br>S.exc ∪ B.exc<br>S.unk − B.exc<br>max(S.min, \|S.inc\|) |
| | card max | | | | $\min\left\{\begin{array}{l}B.max\\S.max\\\|S.inc\|+\|SR.unk\|\end{array}\right\}$ |

FIG. 22

|  | Conceptual | Minimum | Maximum |
|---|---|---|---|
| Srcs | $\dfrac{Edges}{Tgts \times Lbls}$ | $\dfrac{Edges.min}{Tgts.max \times Lbls.max}$ | $\dfrac{Edges.max}{Tgts.min \times Lbls.min}$ |
| Tgts | $\dfrac{Edge}{Srcs \times Lbls}$ | $\dfrac{Edges.min}{Srcs.max \times Lbls.max}$ | $\dfrac{Edges.max}{Srcs.min \times Lbls.min}$ |
| Lbls | $\dfrac{Edge}{Srcs \times Tgts}$ | $\dfrac{Edges.min}{Srcs.max \times Tgts.max}$ | $\dfrac{Edges.max}{Srcs.min \times Tgts.min}$ |
| Edges | Srcs x Tgts x Lbls | Srcs.min x Tgts.min x Lbls.min | Srcs.max x Tgts.max x Lbls.max |

FIG. 23

$V_A = V_B \lor V_C \land V_D$
$V_A = V_E \lor sources(E_Y)$
$V_B = sources(E_X)$
$V_E = targets(E_X)$
$L_X = labels(E_X)$
$A_{A1} = attrs(V_A)$
$A_{A2} = attrs(V_A)$ kAnonSet$A_{A1}$2

FIG. 24

SYSTEM FOR AND METHOD OF CONTROLLABLY DISCLOSING SENSITIVE DATA

CROSS REFERENCE TO OTHER APPLICATIONS

This application is a continuation of U.S. patent application Ser. No. 14/848,300, filed Sep. 8, 2015, which in turn claims priority from U.S. provisional application 62/047,430 filed Sep. 8, 2014, the full content of which is incorporated in this application as though set out at length herein.

FIELD OF THE INVENTION

The present invention relates to selective disclosure of data a requirement of privacy and security regimens, e.g. in medicine, finance, national intelligence and many other fields.

BACKGROUND OF THE INVENTION

Irreconcilable demands for sharing and protecting information hamper progress in research and other areas of responsible data gathering. Challenges are prevalent because parties wish to partially share information. Such is the case in social networks where people desire to share their information with friends but maintain some control over its dissemination. Similarly, the inquiries into terrorist attacks have highlighted the need to share intelligence amongst agencies but have not resolved how to protect sources and methods. Electronic medical records enable access to patient data by different providers at different locations but risk violating patient confidentiality. Security and privacy breaches highlight the gap between current practices and needed protections. What is needed is a technique to protect sensitive information.

SUMMARY OF THE INVENTION

The present invention addresses the problems through use of an adjusted system that produces a collection of possibilities by generating synthetic items ("phantoms") the recipient(s) could believe and combining the synthetic items either with or without the unprotected truth (i.e., the information provider's starting dataset.) In addition to the unprotected truth, the system takes a policy that defines: what information is possible, what information a recipient would believe, what information is sensitive (i.e., where the sender/provider's goal is not to share, but to protect), what information is disclosable (i.e., where the sender/provider's goal is to share), and what degree of variability sufficiently protects sensitive information. Each dataset must be something the recipient believes is possible and must agree on the disclosable information. These per dataset conditions are validity conditions. The collection of datasets must include enough diversity in the sensitive information are sufficiency conditions.

A solution candidate is comprised of the truth and any number of phantoms. Much of the discussion focuses on solution candidates as including the truth is both more difficult and guarantees that any query result is accurate as protection takes the form of ambiguity rather than noisy or incorrect items. A collection of datasets that does not necessarily include the truth is a collection of datasets. By construction, all datasets are valid as defined by the validity conditions and agree on disclosable information. The collection of datasets (whether it is or is not a solution candidate) contains enough ambiguity on sensitive information to adhere by the sufficiency conditions. The sender is assured the protected dataset does not reveal any sensitive information. This allows a recipient to query the collection of datasets as long as they like without requiring any arbiter or notification. One option to perform querying is to query each dataset and then combine the results. If the collection is a solution candidate (must contain the truth), any result that is consistent across datasets must be accurate. Variation in query results introduces ambiguity. Again, for solution candidates the correct answer must appear as one of the query results. If the collection of datasets is not a solution candidate the result may be representative, but there is no guarantee it is.

In one embodiment, the sensitive data disclosure system includes the following components: an alternate encoding of a policy, a new protected representation, a certificate that proves compliance with a policy, a mechanism for enforcing the protections and optionally producing certificates in the process, and a standalone protocol for auditing that cm validate and/or generate certificates. The system applies to structured data including tabular and relational data such as spreadsheets and databases as well as annotated graph data. Salient properties include:

A novel approach to securing structured data based on releasing sets of objects. It includes a formal language for defining sets of objects. Properties of the embodiments may include:

Composability: the ability to combine multiple policies thus allowing enforcement of multiple policies at once;

Applicability: the ability to operate with annotated graphs as well as traditional structured data such as tabular or relational data;

An auditing algorithm enables any recipient with access to the policy and collection of datasets to produce a certificate verifying that the collection of datasets adheres to the policy. This audit process can audit a certificate in polynomial time;

As part of its execution, the implementation produces a certificate of compliance with the specified policy that proves that the output adheres to the policy;

RandomSAT is the core of a phantom creating engine executing on one or more processors. It is a satisfiability (SAT) solver that produces solutions selected at random where each variable is associated with a distribution function. RandomSAT's input language is provably nondeterministic polynomial time complete (NP-complete).

Matching allows two parties (e.g., a disclosing party and a recipient) to identify the overlap (or equivalently non-overlap) between the entries in their two datasets without sharing their data.

Selection criteria scenarios occur when the disclosing party wishes to reveal a selection of their data that matches criteria specified by another party. The party providing the selection criteria wishes to avoid revealing the criteria and the disclosing party with the data wishes to avoid revealing their data. The example embodiment may provide the recipient party either with the data itself or with a mechanism to request approval to receive the data.

Auditing and proving adherence to a policy consists of proving both validity and sufficiency. Proving validity consists of creating an association between data items in a dataset and variables in the policy that satisfy all the conditions of the policy. Such a mapping that is called a witness because it attests to the proof that such a mapping exists. Determining the meaning of the various policy conditions and whether they are met is captured in the satisfies relationship. A dataset that adheres to the policy satisfies that policy and the set of all such dataset that adhere to a policy are the satisfying set a policy defines. A witness proves a dataset adheres to the validity conditions. Similarly, proving compliance with sufficiency conditions involves demonstrating the existence of values for the variables in the sufficiency condition so that all the conditions evaluate to true. Together the witnesses and sufficiency condition assignments form a certificate that proves compliance with a policy.

A novel aspect of certain embodiments derives from the use of a set of objects and by virtue of producing a proof of the security properties in that resulting set rather than saying anything formally about the process used to produce the set as might be done when proving that a transformation approach achieves some goal in its transformation). Application to annotated graphs demonstrates provides particularly powerful advantages. Securing annotated graphs introduces challenges not well studied in tabular data because the annotated graph encoding is both non-local and overlapping.

These and other features and characteristics, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 14 is a representation of syntax for defining sets in a constraint language.

FIG. 15 is a representation of syntax for two constraints rules.

FIG. 16 is a representation of a definition of variable satisfies $\sigma V$, $\sigma E$, $G \vDash c$ FIG. 17 is a representation of semantics for set expressions, where $G=(V,E,M)$.

FIG. 18 is a representation of a policy.

FIG. 20 is a table expressing rules for updating unions.

FIG. 21 is a table expressing update rules for intersection.

FIG. 22 is a table expressing update rules for subsets.

FIG. 23 is a table expressing update rules for cardinality.

FIG. 24 is an example set of vertices, attributes and labels variables.

DETAILED DESCRIPTION OF PREFERRED EMBODIMENTS

I. System Overview

Figure 1:
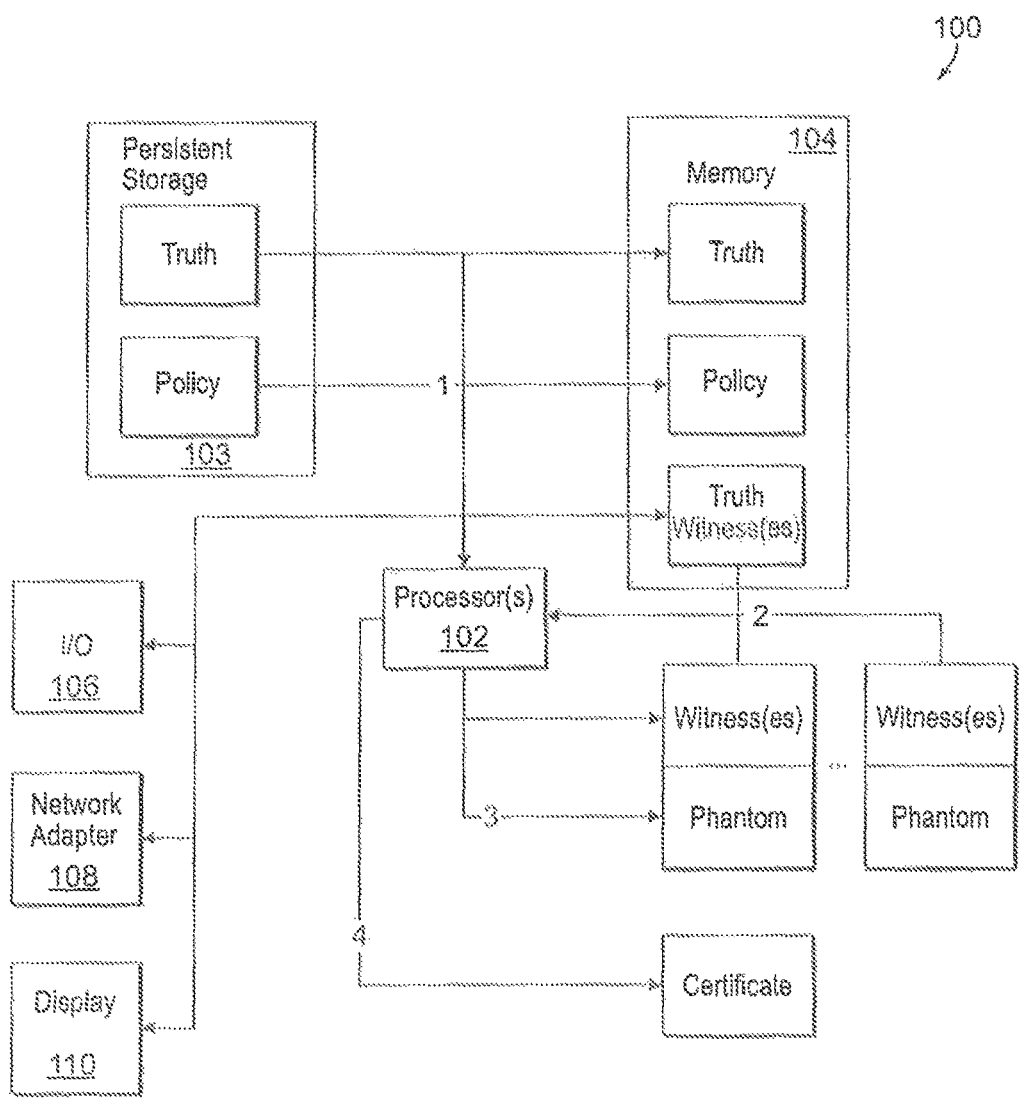
FIG. 1 is a simplified implementation to computing system in accordance with the invention.

Computer implemented systems and methods are presented for selective disclosure of sensitive data. FIG. 1 depicts a simplified implementation of a computing system 100 in accordance with an embodiment of the invention. Computing system 100 includes one or more processors 102, persistent storage 103, memory 104, input/output (I/O) interface(s) 106, and a network adaptor 108. Optionally, the computing system 100 also includes a display 110. The one or more processors can be microprocessors, or other types of processing logic that may interpret, execute, and/or otherwise process information contained in, for example, the memory 104. The information may include computer-executable instructions and/or data that may implement one or more embodiments. The computing system 100 may include a variety of hardware. The hardware may include, for example, some combination of one or more processors, microprocessors, field programmable gate arrays (FPGAs application specific instruction set processors (ASIPs) application specific integrated circuits (ASICs), complex programmable logic devices (CPLDs), graphics processing units (GPUs), reduced instruction set computing (RISC)-based processing devices (e.g., ARM processors), or other types of processing logic that may interpret, execute, manipulate, and/or otherwise process the information. The computing system may include a single core or multiple cores. Moreover, the computing system 100 may comprise a system-on-chip (SoC), system-in-package (SiP), etc.

The I/O interface(s) 106 can be any device that receives inputs and/or provides outputs. Examples of such a device include a keyboard, a mouse, an audio input device, a touch screen, and an infrared input interface. The I/O interface(s) 106 can also be an interface for receiving and sending data to a user device or to another system, e.g., through a network. For example, the I/O interface(s) 106 can be an internet interface, a wireless interface, a data reader, or a printer. The input interface receives data, such as commands, user specifications, and truth data. The output interface outputs information, such as a compliance certificate. Components shown individually in the figure can be combined if desired. For example, a touch screen can have the combined capabilities of the I/O interface 106 and the display 110.

The network adapter 108 can allow the system 100 to exchange information with external networks. Examples of the network adapter 108 include a network interface card (NIC), such as, for example, wireless wide area network (WWAN) adapter, a local area network (LAN) adapter, etc.

In some implementations, the system 100 may be used entirely within the computing network of a single entity, while in other implementations system 100 resides at only one or at both computing systems of different entities. For example, an end user may own a client device, and another party owns a server device. The server device can provide an assurance of selective disclosure of sensitive information service to the client device. In some implementations, the server device may include a device operating in a remote computing environment, e.g., a cloud computing environment. Additionally, or alternatively, the server device may perform one, more, or all operations described elsewhere herein as being performed by a client device.

An embodiment of the selective sensitive data disclosure system reduced to practice by the applicant was written in the HASKELL programming language. It leverages an existing parser to read the truth data represented in GRAPHVIZ™'s dot format and has a custom parser for reading the policy language. RandomSAT™, the auditing engine and the other associated portions of the implementation are all custom implementations proprietary to the applicant.

II. Example Embodiments of Selective Sensitive Data Disclosure

Figure 2A:
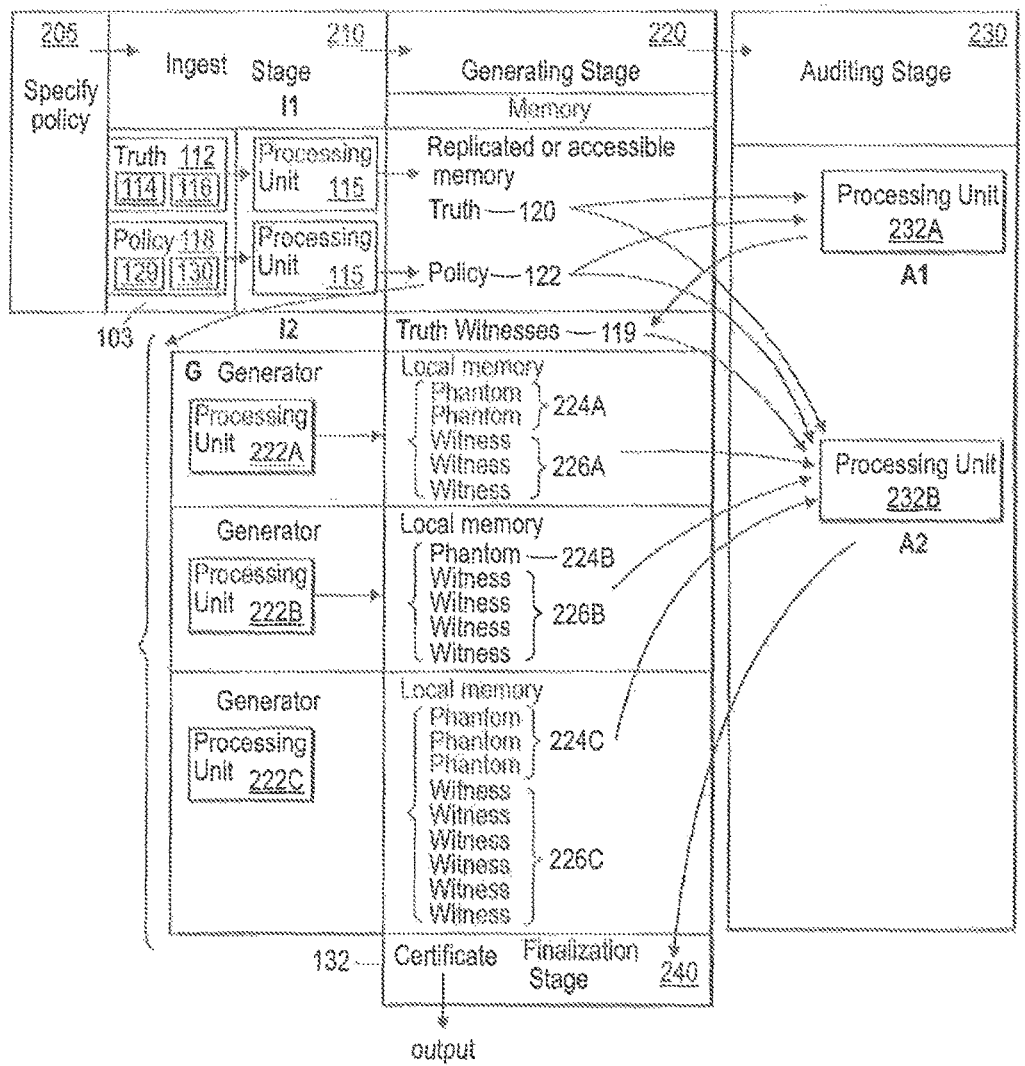
FIG. 2A is a method of selective disclosure of sensitive data in accordance with an embodiment of the invention.
Figure 2B:
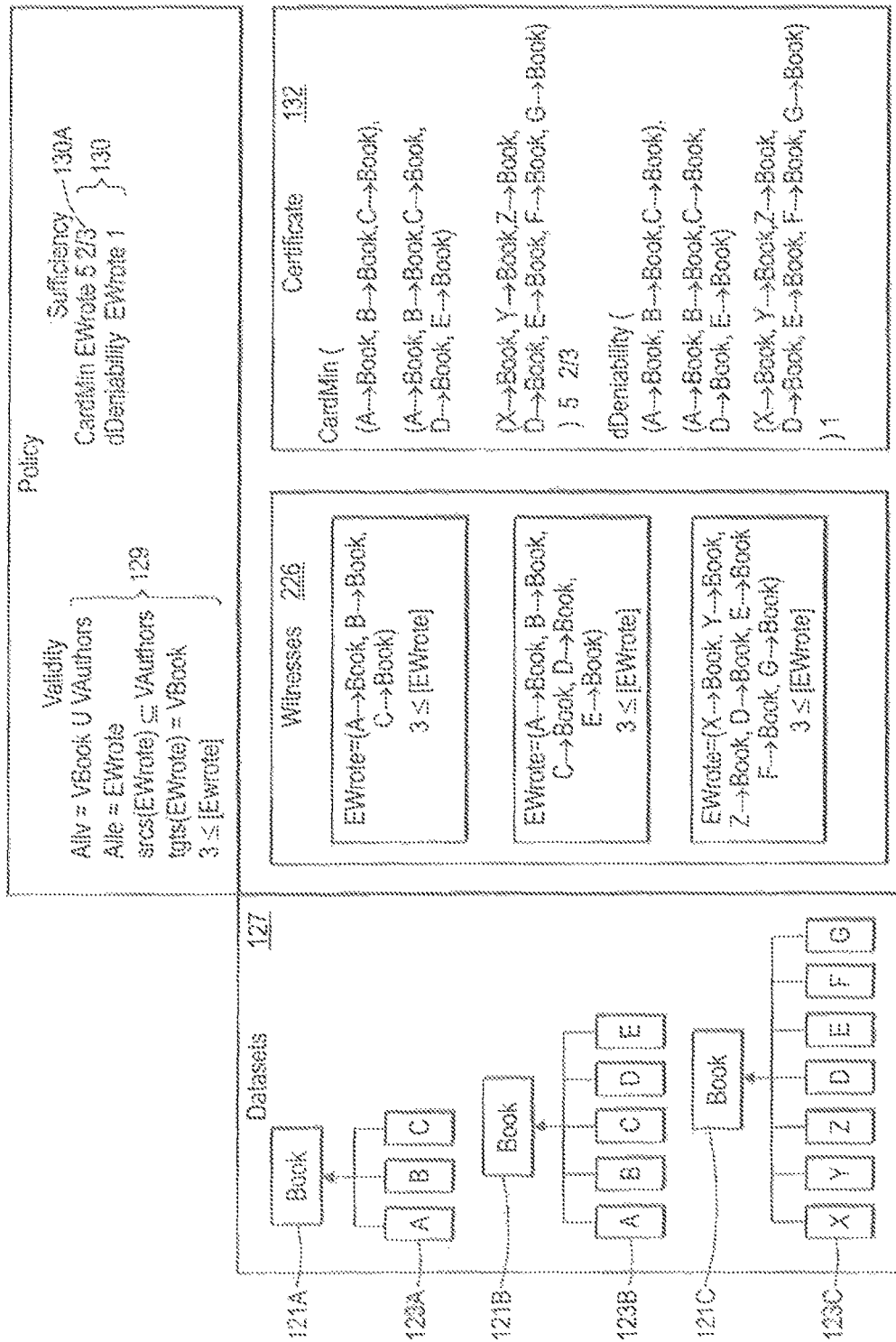
FIG. 2B is an example data structure environment for use in practicing an embodiment of the invention.
Figure 3:
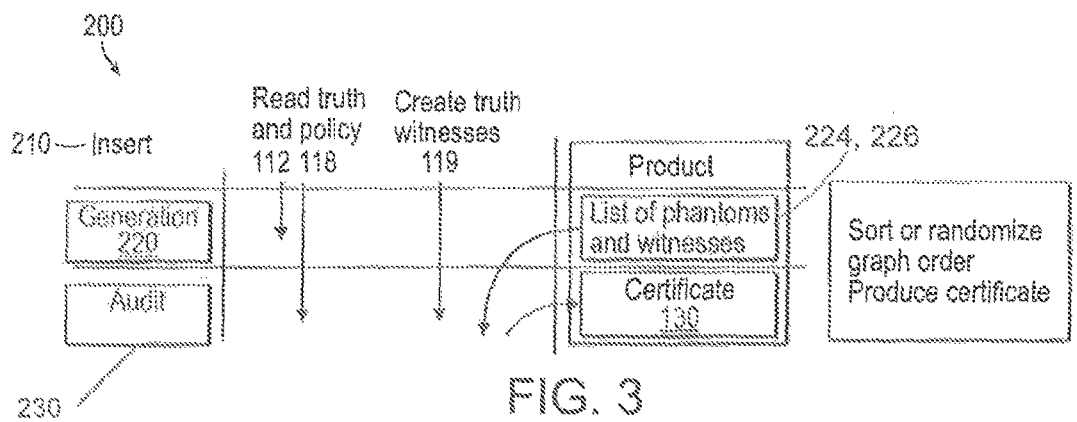
FIG. 3 is a workflow implementation of a selective disclosure of sensitive data method.

FIG. 2A illustrates an example implementation of a method 200 for selectively disclosing sensitive data, with the associated hardware architecture for practicing the method. In this example, the method 200 is comprised of an ingest stage 210, generation stage 220, audit stage 230, and finalization 240, ingest stage 210 may be implemented by an ingestion processor 115 (which may be the same as one or more processors 102), and involves ingesting truth data 112 and at least one policy 118 from persistent storage 103 and producing and storing in memory 104 a truth representation 120 and policy representation 122. True data 112 is comprised of sensitive data 114 and disclosable data 116. Ingestion processor 115 also produces at least one truth witness 119 associating policy variables specified in the policy 118 (for example, policy variables 129 and 130 as shown in FIG. 2B) with the data items 114 and 116 in the truth data 112 (which will be utilized in the audit stage 230.) The in memory representations 120 and 122 are used after this point in method 200. Generation stage 220 may be performed by one or a plurality of generation processing units 222A-222C that may be the same as one or more processors 102 and involves producing one or more phantoms 224A-224C (i.e., synthetic datasets) and respective sets of associated phantom witnesses 226A-226C associating the variables in the policy representation 122 with the data items in the phantoms 224A-224C. As indicated, more than one phantom 224A and associated witness(es) 226 may be produced by any particular generation processing unit 222A. Audit stage 230 may be performed by one or a plurality of auditing processing units 232A-232B that may be the same as one or more processors 102, and operates to check if the truth witnesses 119 and phantom witnesses 226A-226C (and indirectly the phantoms 224A-224C and truth data 112) together (e.g., in some implementations optionally combined into a candidate disclosure dataset for evaluation) pass sufficiency conditions 130 defined by the at least one policy 118. If they do not, the method 200 repeats generation stage 220 to generate another phantom 224N (and witness 226N). If the audit passes, the method 200 proceeds to finalization stage 240 where one of a number of actions may take place, including the production of a certificate 132 indicating that the collection of witness datasets adhere to both the validity conditions 129 and sufficiency conditions 130 of the policy. Several alternative approaches exist the combining phantom data and truth data for evaluation. In one example, phantoms are generated and disclose those. The truth data is not guaranteed to be included. A disadvantage is that it does not necessarily reveal any specific facts i.e. there is no definitive statement as to the veracity of any query issues to such a collection of phantoms. Another option may be to mandate inclusion of the truth data. The disadvantage is that there is now something very real to protect and it might not be easy to achieve that protection. The advantage is that querying the collection of items always results in a truthful answer (specifically as truthful as the input truth dataset) with ambiguity but nothing that is incorrect.

FIG. 2B illustrates in more detail the data structures uses in some implementations. Datasets 127 include at least one truth dataset (e.g., the associated book variable 121A and author variable 123A) or one phantom dataset (e.g., the associated book variable 121B and author variable 123B). From theses, truth witnesses and/or phantom witnesses, shown in the set of witnesses 226 may be generated for evaluation. Policy 118 contains the validity conditions 129 comprised of validity policy variables, and sufficiency conditions 130 comprised of sufficiency policy variables, such as CardMin in 130A. A certificate of compliance 132 may be generated if the collection of candidate disclosure possibilities (datasets) result in witnesses passing the sufficiency audit.

FIG. 2A depicts how the steps of method 200 can be parallelized to leverage various hardware resources to accomplish the goal of sharing information while protecting sensitive portions. Ingest stage 210 operations may precede any other operations. Given the policy (or policies) 118 and truth data 112 on persistent storage 103 (or provided via a network through network adapter 108), the system 100 first reads these data in, optionally optimizes them (as described below), and produces in memory 104 truth representation 120 and policy representation 122, which are accessible to all processing units (computer processors—including CPUs and/or graphics processors) in the system 100. Each generation processor 222A-222C takes the policy representation 122 and produces synthetic data (phantoms 224A-224C) and witnesses 226A-226C that associate policy variables with entities in the phantoms 224A-224C. Witnesses 226A-226C comprise associations that prove that a synthetic data item adheres to the policy representation 122 and provide the entity mappings to evaluate the sufficiency conditions 130 (i.e., whether the collection of values for a variable contain sufficient diversity). Generation processors 222A-222C can proceed completely in parallel producing phantoms and witnesses.

Audit stage 230 may be invoked independently where it makes sure a truth representation 120 adheres to a policy representation 122 by constructing a witness. Presuming that succeeds, the one or more auditing processor 232A-232C repeatedly cheeks to see if the sufficiency conditions 130 are met, and if not it adds one or more additional witnesses 226 from those produced by the generation processor 222A-222C. The auditing stage 230 repeats as long as the sufficiency conditions fail. When the conditions succeed, the method 200 enters finalization stage 240. During finalization, a certificate of compliance 130 may be generated by corralling the relevant witnesses and sufficiency condition checks the audit process used. The system 100 then may collect the associated phantoms and truth and either sorts or randomizes the order of those datasets. The collection of datasets and certificate constitute the output of the system. Note that while the figure envisions multiple processing units these could be one or more physical entities.

FIGS. 2A, 2B, 3 and 9 depict an example embodiment of method 200 as a workflow.

The start of an information sharing session may commence by a Policy Specification Stage 205.

Ingest Stage 210

Then, Ingest processor 115 may utilize two parsers (labeled I1 and I2 in FIG. 2A). Parser I1 may read truth data 112 and produce in memory truth representation 120. Parser I2 may read the policy for policies) 118 and produces in memory policy representation(s) 122. Ingest processor 115 may take additional measures to optimize the truth data or policy to make them smaller or otherwise easier to work with.

Generation Stage 220

Figures 6, 7, 8:
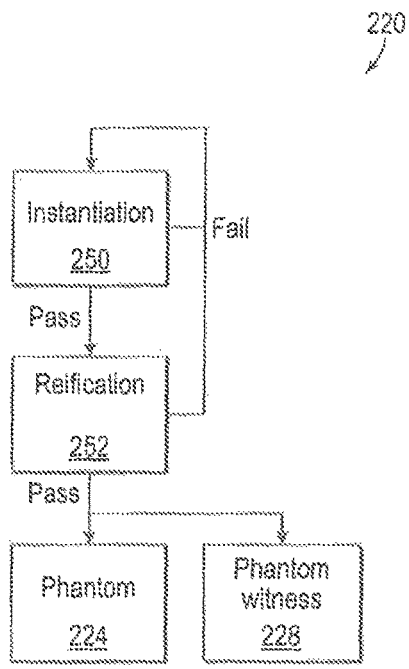
FIG. 6 is a flow diagram for a generation stage process.
FIG. 7 is a table representation of exemplary datasets.
FIG. 8 is a table representation of exemplary data disclosure.
Figure 9:
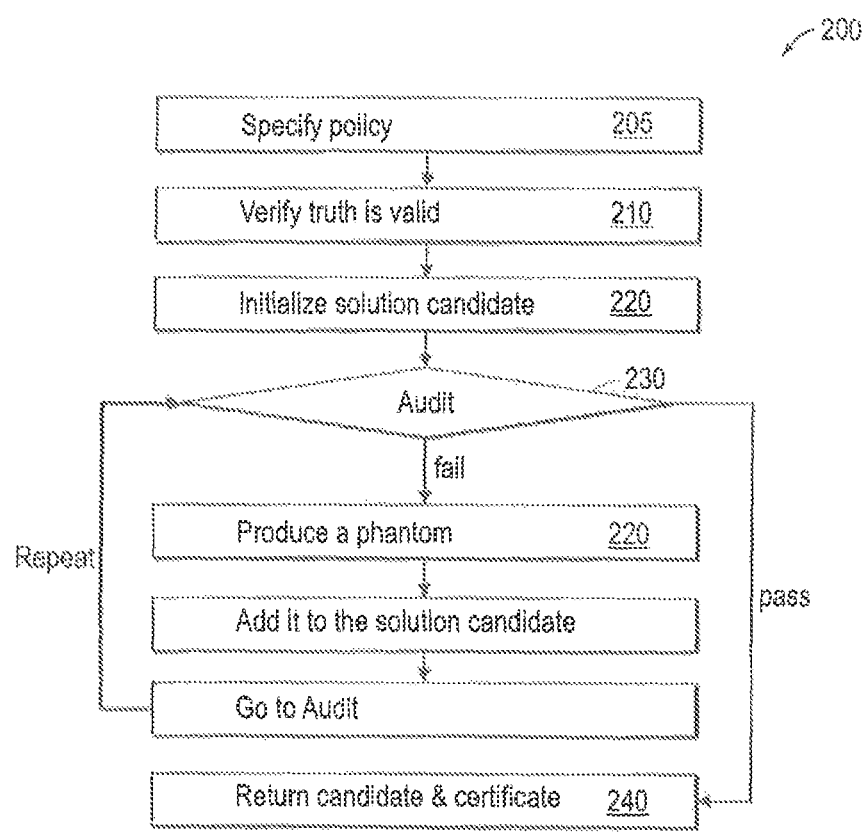
FIG. 9 is a flow diagram of an exemplary method of selective disclosure of sensitive data.

As shown in FIG. 6, generation stage 220 may then repeatedly attempt to create a phantom 224. When successful, generation stage 220 (i.e., one or more generation processors 222) may produce a phantom 224 and one or more phantom witnesses 228. Generation stage 220 may include an instantiation step 250 and reification step 252. Instantiation step 250 sets the cardinality of each policy variable and reification step 252 assigns elements to each variable. Instantiation selects from the distribution specified in the policy 244 to assign a cardinality to the variable. Continuing the paper example, consider a case where the variable papers is specified to represent 2 to 7 papers where the exact count is selected uniformly at random, instantiation would sample from a random distribution to select the actual number. Alternatively, the policy 244 might specify a weighted uniform distribution where each possible choice between 2 and 7 is weighted by the number of ways to select that number of papers. Other distributions are also possible. Regardless of how selected, assume that instantiation results in the papers variable representing three papers. Reification step 252 then selects individual elements using a second distribution (again possibly uniform, normal, etc). After the reification step, papers might be associated with papers {X,Y,Z}. On successful execution, reification results in assignments of policy variables to data items. This assignment comprises a witness 248. Reification step 252 also may create the dataset or phantom. The output of reification is therefore both at least one phantom witness 226 associated with a phantom 224.

Complexities in generation stage 220 may arise from impossibilities and optimizations. For example, if the policy (118 or 244) specifies a subset of papers called award-winners, then instantiation step 250 and reification step 252 must respectively ensure that award-winners is smaller (or equal) to papers and that every paper in award-winners is also present in papers. Enforcing these criteria can also influence selection criteria. A naïve implementation of the selective sensitive data disclosure method and system may skip all such optimizations, but will likely result in a high failure rate leading to no phantom generation and a need to restart the process. A reduction in or avoidance of such failure rates may be achieved by propagating the implications of one selection criteria to other policy variables. For example, instantiating papers with size 5 can propagate by setting the maximum size of award-winners to 5.

Audit Stage 230

With reference again to FIGS. 2 and 9, Audit stage 230 may comprise steps for checking that each dataset is valid, and checking that the group of datasets provide the specified protection. These are addressed respectively by finding witnesses and analyzing in light of sufficiency conditions 130. For any data object that lacks a witness, one may be created (e.g., truth witness 119 is created in FIG. 2). Generation processor(s) 222 produces witnesses 226 as part of phantom 224 generation, obviating the need to create a witness for each phantom. However, the truth representation 120 has no witness yet, thus finding one is required. Similarly, in a standalone audit scenario, the (phantom and truth) datasets may not already have associated witnesses, especially if the policy used to protect the data differs from the policy being enforced as part of the audit. Checking sufficiency conditions 130 ensures that the collection of data items comprising the set of phantom witness(es) 226 and/or truth witness(es) 119 being evaluated as a candidate disclosure includes enough diversity to protect the sensitive data 114 to the extent specified by the policy 118. There are cases where the truth captures multiple datasets and might be safe to disclose on its own. For example, if one has a collection of experiments in a virtual lab notebook where in each case five subjects were run through some process and the five people are different in each and every case. It is possible that the truth on its own contains sufficient diversity so no phantoms need be added. This is not the typical case, and would be identifiable.

Two aspects might be non-intuitive, namely: a truth or phantom data item may have multiple witnesses (e.g., phantom witness 226A comprises three witnesses), and adding a witness may lead to retrogression. A single dataset must have at least one witness and may have multiple witnesses because there may be more than one way to assign data elements to policy variables so as to adhere to the policy 118. For example, a policy 118 that states that there are at least three authors to a paper and the audit is run on a paper with authors {A,B,C,D,E} then there are multiple witnesses to the existence of at least three authors including {A,B,C}, {A,B,D}, {A,B,E} etc. There is a performance tradeoff between searching for one or more than one witness. In any case, a brute force search—using some total ordering to assigning each variable to a selection of the elements it could represent repeatedly until all policy variables meet the validity conditions 129 must find a witness fin each valid data item and may find more than one. An additional witness may cause a sufficiency condition 130 that was met to fail. For example, if two thirds of papers must have at least seven authors then adding a book with three authors to a solution candidate consisting of two seven-author papers and one four-author paper would lead to the sufficiency condition that had passed failing.

Figure 4:
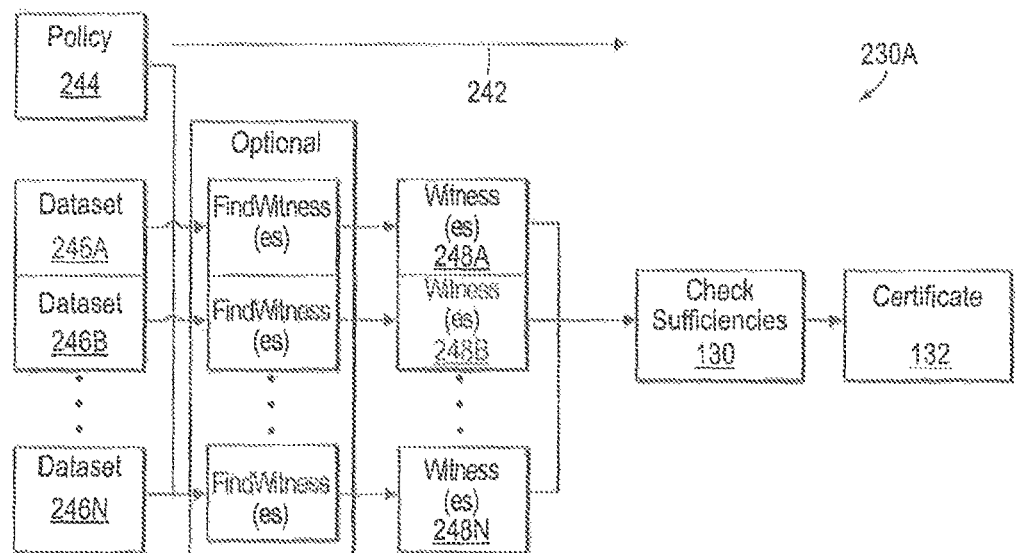
FIG. 4 is a workflow implementation of a standalone audit process of a selective disclosure of sensitive data method.
Figure 5:
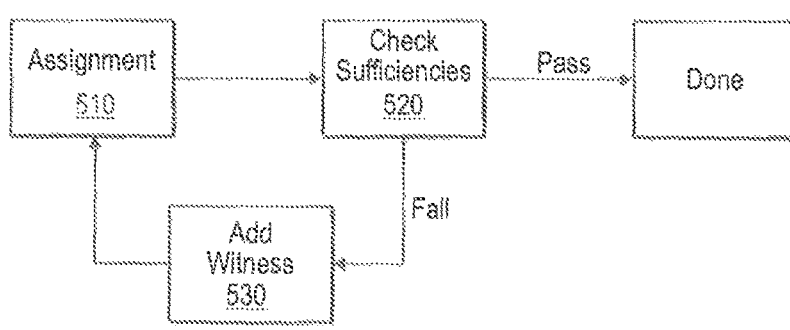
FIG. 5 is a flow diagram for a sufficiency condition checking process.

FIG. 4 depicts a workflow 242 for a standalone (independently invocable) version of audit stage 230. Standalone audit stage 230A differs from the sharing version of audit stage 230 in that every (truth and phantom) dataset 246A . . . 246N lacks a witness. Standalone audit stage 230A searches for one (or more) witnesses 248A . . . 248N for each dataset 246A . . . 246N input. Once witnesses 248A . . . 248N exist, the two versions of audit stage 230, 230A may proceed identically as they simply check compliance with the sufficiency conditions 130. Sufficiency conditions 130 can be checked iteratively as shown in FIG. 5 as follows:

step 510: start with the empty set of witnesses (step 510);

step 520: associate with each policy variable that appears in a sufficiency condition 130 of policy 244 the set of values that variable assumes across datasets 246A . . . 246N. For example, the variable papers might be associated with {{A,B,C}, {A,B,D}, {A,B,E}}. Each of the sufficiency condition variables returns a Boolean value once the variables are specified. This makes it possible to evaluate the sufficiency conditions 130. By saving the values for each policy variable, auditing can proceed iteratively. If the sufficiency conditions are met, the audit stage completes. If the sufficiency conditions are not met, the audit stage proceeds to step 530.

step 530: Create a new witness and add its values to the previous assignment of policy variables and then re-evaluate the sufficiency conditions.

Auditing supports three use cases: running within generation to decide when to stop generating phantoms, auditing with witnesses—where in addition to the policy and the set of datasets there are witnesses that associate datasets with policies, and auditing without witnesses in the case that there is a policy and a set of graphs. These three cases differ in which witnesses are provided. During generation, there are witnesses for the phantoms (because producing a phantom implicitly defines a witness) but not for the truth, for audits with witnesses, all witnesses are available, and for audit without witnesses none of the witnesses are available. To support these cases, audit provides two operations—finding witnesses and checking sufficient conditions. Finding witnesses takes a specific policy and a graph and produces witnesses that assign element variables to elements of the graph.

Checking sufficiency conditions takes the sufficiency conditions and a set of witnesses and determines whether the set of witnesses complies with the sufficiency conditions. Each sufficiency condition specifies a diversity condition on one or more policy variables A sufficiency condition can be expressed as a predicate on one or more sets of values—potentially with additional constants. Deciding sufficiency begins by aggregating the values of the policy variable over all witnesses producing a set of sets of data items. Checking one sufficiency condition devolves into comparing the number of sets of data items that meet a condition with one or more constants. If the set of witnesses meets all the sufficiency conditions the audit passes, otherwise the audit fails. Note that with the exception of finding witnesses for the truth, the system does not identify the truth to either the generator or the auditor. The only portion of the system that inspects the truth is the part that generates witnesses to ensure that the truth complies with the validity portion of the policy.

In some embodiments, no truth witnesses or no phantom witnesses may become part of the candidate disclosure possibility.

In other embodiments, two or more dissimilar policies might be enforced. Any two policies can be combined to produce a single combined policy. When composing policies, intersect the constraints and union the sufficiency conditions. As a result, the combination of two policies may yield a policy that cannot be satisfied. Formally, given two policies P1 with constraints C1 and sufficiency conditions S1 and policy P2 with constraints C2 and sufficiency conditions S2, construct P12 with constraints C12=C1++C2 (describing datasets that adhere to both C1 and C2 and are therefore found in the intersection of C1 and C2) and sufficiency conditions S12=S1++S2 (describing sufficiency conditions that require meeting both sets of conditions). The ++ concatenation operator simply concatenates and performs alpha-renaming (variables are systematically renamed so as to avoid a collision if two policies happened to use the same variable names). For example, two distinct policies may be employed by the provider of the information. In other situations, one or more recipients may have their own policy to be enforced against a dataset that a data provider/disclosing party has already passed through audit under their own policy. Consider a party that wishes to enforce a policy on data that has already been protected using the approach described herein. The party would have one or more datasets and may also receive a collection of witnesses. If there are no witnesses, witnesses can be created as described earlier. This provides sufficient information to perform an audit—in fact it is the process used for standalone audits. If the audit fails, the collection of datasets can be immediately remediated even though the party cannot identify which dataset represents the truth (or potentially whether the truth is even in the collection of datasets). To proceed, the party proceeds with the generation process as described with respect to FIGS. 1-6, starting with multiple datasets and multiple witnesses and proceeding as usual. In short, the startup is slightly different as instead of seeding the system with one dataset the system is seeded with multiple—otherwise the proceeds proceeds in the same way.

III. Application to Tabular and Relational Representations

With reference to FIGS. 7 and 8, a simple non-limiting example application may prove helpful. Consider two individuals Mandy 702 and Nick 704. Mandy 702 is twenty-three years of age, has brown eye color and blond hair color and Nick 704 is of age twenty-six and has blue eye color and brown hair color. FIG. 7 depicts this information in tabular form as a single table—one could also use a collection of tables. FIG. 8 contains a table that demonstrates how to reveal their names 706, ages 708 and hair colors 712 without revealing their eye colors 710. The sufficiency conditions for this policy would be that for each unique individual there are at least two distinct eye colors 714A, 714B. FIG. 18 depicts a policy that expresses this condition.

IV. Application to Annotated Graphs

An exemplary application of the selective sensitive data disclosure method and system will now be described in detail. By no means is the example intended to limit the functionality of the system to the particular implementation architecture, data format, or application. As will be described below, potential applications of the system and method span a wide range of industries.

Figure 10:
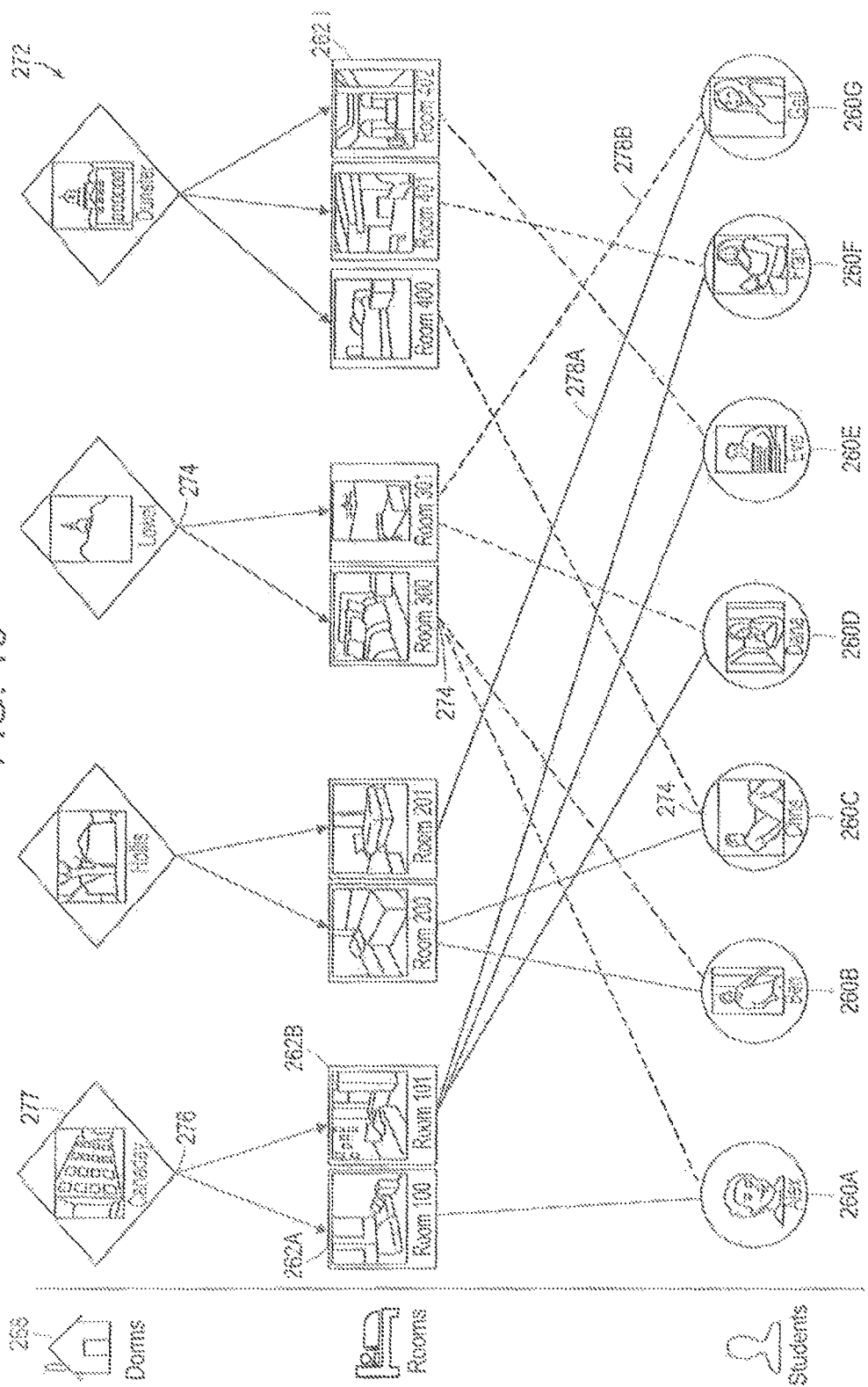
FIG. 10 is an example of an annotated graph for roommate selection.
Figures 11, 12, 13:
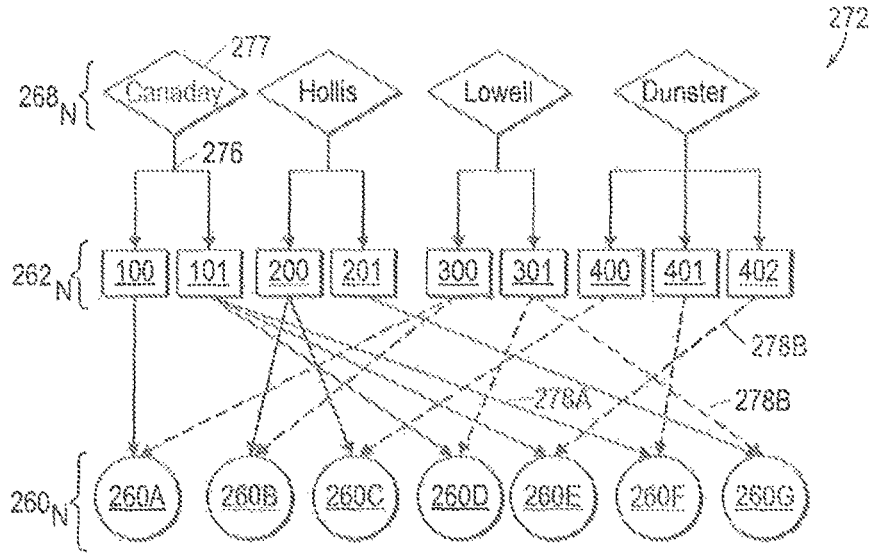
FIG. 11 is an anonymized version of the example annotated graph for roommate selection.
FIG. 12 is an example table of roommate directory information.
FIG. 13 is an example annotated graph model.

With reference to FIGS. 10-12 (FIG. 11 generalizing to an anonymous data display), consider a scenario where sociologists are researching how students 260A-260G select their roommates. Armed with room assignments for a cohort of students, the researchers compare the assignments for the same cohort of students during two consecutive years (e.g., freshman 264 and sophomore 266). The dataset consists of rooming assignments and student directory data. Rooming assignments specify what room 262A-262I each of the students 260A-260G lived in for each of the two years, and implicitly with whom they lived. The first year of rooming assignments represents the students freshman 264 year where students generally know few if any of their fellow students. Since students do not know each other, the university assigns students to rooms. For their sophomore 266 years, students choose their own roommates thereby revealing their preferences. Student directory data contains portions of the rooming data for those students that chose to publish their information. A student can choose: not to appear in the directory; provide their name 270A-270E only; provide their name and dorm 268A-268D; or provide their name, dorm and their specific room. Each student makes a choice for each year. In addition to the data provided explicitly, there are additional facts that are assumed public. For example, Harvard University does not allow coed dormitories. At the conclusion of their study, the researchers are required to disclose their data to the community at large. Existing attempts to anonymize the data may violate federal regulations on student privacy (Family Educational Rights and Privacy Act (FERPA), 20 U.S.C. § 1232g; 34 CFR Part 99). A student's privacy must be protected even in light of the choices made by other students. For example, a student's decision to include his room assignment in the directory does not eliminate his roommate's right to privacy. The funding agency demands that the researchers either release their data or return the funds.

Thus, the dataset for this example comprises two consecutive years of rooming assignments for the same 1283 students. Students occupied 514 rooms freshman year and a disjoint set of 597 rooms sophomore year. All names, rooms and dorms have been replaced by unique identifiers. One can tell if a unique identifier refers to a student freshman room, freshman dorm, sophomore room, sophomore dorm, but not which student, room, or dorm it represents. To make this clearer, FIG. 11 uses alphabetical fictitious names and arbitrarily assigns dorm names rather than unique identifying numbers. An actual application might preferably use anonymous numbering throughout. One can clearly see that the roommate data forms a graph 272. Each student, room and dorm corresponds to a vertex 274 and each vertex is annotated (e.g. dorm "Canaday" 276). Students and dorms have names whereas rooms have numbers. There are three types of edges 278A-278C distinguished by their labels. Freshman labeled edges 278A (depicted as solid lines in the figures) depict freshman rooming assignment and similarly sophomore labeled edges 278B (depicted as dashed lines in the figures) depict sophomore assignments. Containment relationships relate rooms and dorms (depicted as squiggly black lines).

Students' rooming assignments are also partially disclosed in the student directory that includes a student's name and room assignment, as shown in FIG. 12, representing the student directory data table 280 for this illustrative example. Students may choose to exclude part or all of their information from the public directory. Each row 282 in the table 280 represents a student 260. Each student may specify: a name, a dorm, and room for each of freshman and sophomore years. Any of the data table cells 284 can be empty except that ifs room is specified the dorm must be too—because room numbers implicitly identify the dorm. In the sample directory data table 280, assume last names are "real" names since first names are unique identifiers.

In addition to the data encoded in the dataset itself, there are additional facts that limit the space of possibilities, which may be referred to as auxiliary knowledge. The following is a list of auxiliary knowledge that may be applicable to this student housing example:

(a) Each room is either exclusively male or female with no coed assignments;
(b) Rooms are organized into residential dormitories—referred to as dorms or houses—Where each house is a collection of one or more buildings;
(c) Room numbers implicitly identify the dorm;
(d) Rooms have capacities specifying the number of students that live in that room in the given year;
(e) A single room (single) houses one student, a double room (double) houses two and so forth for triples, quadruples etc.;
(f) Room capacities as well as the arrangement of rooms in dorms are public. In addition, it is known that no room can accommodate more than six students. Thus, if exactly one dorm has a quintuple, the quintuple identifies the dorm;
(g) The rooms and houses for freshmen are disjoint from those for sophomore year;
(h) A rooming assignment associates a student with a room and a residential dormitory; and
(i) Each student has two rooming assignments, one for freshman year and one for sophomore year.

A goal may be to disclose as much as possible about the student rooming assignments without violating student privacy as mandated by regulations. The FERPA is a Federal law that protects the privacy of student education records. A student's right to privacy must remain intact regardless of the privacy choices made by their roommates. A safe harbor exemption allows disclosure of student data as long as every student is k-anonymized to be indistinguishable from at least k others. In the current example, k=5 the techniques may be applied to arbitrary k.

To illustrate the inability to consider the assignments and directory separately, the following demonstrates how previous combination attempts resulted in identification of all the students. Since E is in Dunster 402, she must be Eve 260E in the graph 272 and must therefore live in Canaday 101 Freshman year. Similarly, F is in Dunster 401 must be Fran in the graph and must also live in Canaday 101. The third person in Canaday 101 must be Dana and must therefore live in Lowell 301. A is the only remaining person in Canaday and must be Alex who lives in Canaday 100 and Dunster 300. The only person left in Lowell is C and must be Chris who lived in Hollis 200 and Lowell 400. B was also in Hollis 200 and must be Ben who lived in Dunster 300. This leaves Ga who, by elimination, must be Gail and must have lived in Hollis 200 and Dunster 301. At this point everybody's name and rooming assignments is known. This is without even using some of the auxiliary knowledge such as the lack of coed rooms, thus it should be possible to extract all the information with even less directory information. Clearly, one can enforce the policy if nobody reveals any directory information, and one cannot possibly enforce student privacy if one student reveals nothing and the other reveal everything. The interesting cases lie between these extremes.

Accepted practice for protecting this information is to anonymize each entity by replacing each student, room and dormitory with a unique identifier. An identifier reveals whether it represents a student, room or dorm but does not reveal which student, room or dorm it represents. The illustrative example of assignments and directory data contains just such an anonymization. However, even in the presence of such anonymization, one can identify all the students. All one needs to do is to show is that there existed one student who could have been fewer than 5 possible students in the graph, but the example went much further and revealed all the students completely. Clearly, the 5-anonymity policy is much harder to enforce than "don't reveal everything".

More formally considering the graph model with reference to FIG. 13, a graph G 286 may contain sets of vertices V 288, edges E 290, attributes A 292 and labels L 294 (selected from universes V, E, A, L), E may represent a set of edges comprised of one source vertex (in V), one destination vertex (also in V) and one label (in L). M may be the attribute mapping function that, for every vertex in V, associates exactly one attribute in A. The formalism supports both cyclic and acyclic graphs. It assumes directed edges, but one can model an undirected edge as a pair of edges connecting the same vertices in opposite directions.

This graph model mandates that every vertex 274 has exactly one attribute and every edge 278 has exactly one label. It can support unattributed vertices and unlabeled edges by introducing an attribute "no attribute" and a label "no label". It can also provide limited support for multiple annotations. Should one want to distinguish students based on name and date of birth, annotations could be pairs capturing both. For example, one could assign both name and date-of-birth attributes to each policy variable by constructing an annotation out of a series of name/value pairs. In this case, the vertex 274 representing Alex, might be annotated with name: Alex, dob:Jan. 1, 1994.

A collection of user studies determined that, in practice, people use annotations in two ways. Sometimes they uniquely identify a graph object—an edge or vertex—whereas other times they denote group membership. This corresponds to associating a vertex either with the annotation "Canaday dorm" 277 to uniquely identify the dorm or with "Dorm" to identify its group. This distinction can fade when group membership uniquely identifies an object. For example, one of the dorms on campus has separate entryways with one room per floor per entryway. In that dorm, knowing the dorm, entryway and floor uniquely identifies the room.

In the extreme, annotations can encode arbitrary meaning. For example, an annotation could contain the statement "Alex and Ben were freshman roommates" and could include Alex and Ben's digital signatures. Since the system cannot infer the meaning of an arbitrary string in an arbitrary context, it cannot prevent an annotation from revealing information that should be protected. The goal is to protect annotations in as much as they interact with the graph, but one cannot reasonably consider any possible way an annotation could encode information. The formalism supports treating annotations as either unique identifiers or as indicators of group membership, but not as conveying arbitrary meanings.

Partial Disclosure

An advantage of the selective disclosure of sensitive data implementations is that it reframes the challenge of partial disclosure by a disclosing party through use of a constraint based policy language and generation of synthetic data that a recipient would believe, in order to create richer and provably compliant partial disclosure.

Policy Language

Most security and policy transformations in existence frame the challenge in terms of utility—how much of the unprotected information is preserved. In contrast, implementations described herein frames the challenge as:

(a) What information must be disclosed?
(b) What information must be protected?
(c) What protection is considered sufficient?
(d) What would a recipient believe?
Refraining the problem this way enables novel solutions that can provide richer sharing and/or stronger guarantees.

Implementations described herein make use of a constraint language to express a privacy policy. The policy answers the four questions listed above. This constraint language can concisely describe a set of objects ranging from graphs to more traditional tabular and otherwise structured data. Since graphs represent the moat complex case, the language description is in terms of graphs. For non-graph data, the variables may be limited to vertices (and optionally attributes) and the edge and graph operations (sources, targets, labels, etc.) may be removed. The set of objects the policy describes are called "valid objects" and the sufficiency conditions specify the degree of variability required to protect sensitive information. Constraints place restrictions on the vertices, edges, attributes, and labels of a graph. Constraints may include free variables that range over sets of vertices and sets of edges. For example, a graph G satisfies a set of constraints if there is an assignment of variables to the vertices and edges of G that satisfies all of the constraints. This assignment of variables to graph elements may be referred to as mapping.

In some embodiments, two types of constraints may be defined, subset constraints and cardinality constraints. Subset constraints specify that one policy variable is a subset of another policy variable. Cardinality constraints bound the minimum and maximum cardinality (how many data items it can represent) of a policy variable.

Constraints

Constraints will now be described with the assistance of constraint language syntax examples shown in FIGS. 14 and 15. FIG. 14 defines the exemplary syntax for sets of vertices V 288, edges E 290, attributes A 292 and labels L 294. FIG. 15 presents the syntax of constraints placing restrictions on those sets. Subset constraints require that one set is a subset of another. Expressions A and B may refer to sets of vertices, edges, attributes of vertices, or labels of edges. Cardinality constraints place bounds on the size of a set A.

Set expressions describe sets of vertices (Set_V) 288, edges (Set_E) 290, attributes of vertices (Set_A) 292, and labels of edges (Set_L) 294. Vertex set expressions Set_V 288 include variables x∈V 288A, that range over sets of vertices. For generality, assume graphs are directed and encode undirected graphs by using two directed edges in opposite directions to encode an undirected edge. The expression sources (Set_E) 288B represents the set of source vertices of the edges described by edge set expression Set_E. Similarly, targets (Set_E) 288C represents the set of target vertices of the edges described by Set_E. The expression Allv288D represents the set of all vertices of a graph. Vertex set expressions (and other set expressions) are closed under the union ∪ and intersection ∩ operators. Note that intersections bind more tightly than unions.

Edge set expressions Set_E 290 include variables y∈E 290A that range over sets of edges. The expression ins (Set_V) 290B represents the set of edges that have a target vertex in the set of vertices described by vertex set expression Set_V, and outs(Set_V) 290C represents the set of edges that have a source vertex in the set described by Set_V. The expression $All_E$ 290D represents the set of all edges of a graph.

Attribute set expressions Set_A 292 include constant sets of attributes {a1, ..., aN} 292A, and attrs(Set_V) 292B, the set of attributes of the vertices described by Set_V. The expression attrs (All_V) 292B refers to the set of all attributes of a graph, and thus do not require a special expression.

Finally, label set expressions Set_L 294 include constant sets of labels {l1, ..., lN} 294A and labels(Set_E) 294B, the set of labels of the edges described by Set_E. As with attribute sets, there is no need for a special expression to refer to the set of all labels of a graph, as the expression labels(All$_E$) is equivalent.

The formal shorthand forms are convenient. A=B is shorthand for the pair of constraints A⊆B and B⊆C. Similarly cardinality(A)=n is shorthand for n≤cardinality(A) ≤n. Also, A=∅ is shorthand for 0≤cardinality(A)≤0.

The policy language's semantics translate from constraints to a set of graphs using the rules below. If constraints C describe a set of graphs Ĝ={G1, G2, ..., GN} then Ĝ is the satisfying set defined by C. Graph G satisfies a set of constraints C if and only if there exists an assignment from free vertex set variables V and free edge set variables E such that G satisfies each constraint c∈C. Note that there are no free attribute or label variables. More formally, G=(V,E,M) satisfies set of constraints C if and only if there exists a function σV from V to P(V) and a function σE from E to P(E) such that for all c∈C, σV, σE, G ⊨ c. Since there are no free attribute or label variables there is no need for σA or σL.

The relation σV, σE, G ⊨ c, defined in FIG. 16 holds when graph G satisfies constraint c with vertex set variables and edge set variables replaced by sets of vertices and edges of G according to functions σV and σE.

FIG. 17 defines the denotational semantics of set expressions: [[A]] σV, σE, G is the set of vertices, edges, attributes, or labels of G to which set expression A refers. Constraints are an expressive yet concise means of specifying a set of graphs and bind variables that are useful for specifying sufficiency conditions.

While counter-intuitive, the requirement that one must account for all vertices and edges in G is a feature, not a limitation. It allows stating that nothing is being hidden when all the information is being made explicit. Alternatively, it allows indicating precisely how much information is being hidden. For example, stating that there are zero to three edges between A and B while providing no further information about A and B.

Using two variables HiddenV and HiddenE, enables explicit definition regarding how much information is hidden. To hide the maximum amount of information, the bounds on HiddenV and HiddenE would be left unspecified, thus placing no bounds on how many vertices or edges are assigned to these hidden variables. These hidden variables precisely describe hidden information. Similarly, one can choose to be explicit about how many vertices one is hiding. For example, to reveal that one is hiding exactly three vertices one would bound the cardinality of HiddenV to exactly three. Thus, even though the invention imposes strict requirements on constraints, the users have options for deciding both how much to reveal and how much to say about what they are not revealing.

Sufficiency Conditions

With reference again to FIGS. 2A and 2B, sufficiency conditions 130 express requirements on the degree of variability in the set of data items comprising a disclosure candidate necessary to protect sensitive data 114. An earlier example specified one such condition as: at least two thirds of papers 121A-121C must have at least three authors 123. Overall a sufficiency condition 130 takes as input one or more policy variables and optionally any number of constants. For example, min_ratio(CardMin(authors, 3, ⅔) would specify that at least ⅔ of authors have at least "3" authors (e.g., at policy variable CardMin 130A). This presumes that a policy variable authors specifies the authors for the relevant papers and that min_cardinality selects items with the specified cardinality and min_ratio is a Boolean function that determines whether the specific ratio is met. The invention supports adding an arbitrary set of such conditions.

This approach alters existing definitions of anonymity. In existing literature, k-anonymity requires that any entry in the output could represent at least k entities in the input (including consideration for quasi identifiers etc.). As a result of the change in framing achieved by the present implementations, there are at least two definitions for k-anonymity. Intuitively k-anonymity for sets provides diversity in the possible constituents of a set whereas k-anonymity for elements and d-deniability protect the constituents of the set. For example, to provide a variety of possibilities as to which players made the Brazilian national soccer team one might insist on three possible teams, but they might all include Edson Arantes do Nascimento (better known as Pele). K-anonymity for sets protects the identity of the team as a whole but not the individual members. In this example, k-anonymity for elements applies when protecting the assignment of players in an expansion draft; where one seeks to provide each player assignments to several teams. Finally, d-deniability provides each player with plausible deniability so they can each provide at least D scenarios where they are not being sent to the Houston Dash.

A k-anonymity for sets condition specifies a set variable and an integer value for k to specify that the variable must correspond to at least k distinct sets of values. For example, a k-anonymity for sets condition on variable VRoom101 with a k of 3, would be satisfied if VRoom101 could contain any of {Dana,Eve,Fran}, {Dana,Eve,Gail}, or {Dana,Fran, Gail}. A k-anonymity for elements condition specifies a set variable V, a list of set variables ws, and an integer value for k to specify that each of the elements in V must be associated with at least k distinct variables in ws. For example, a k-anonymity for elements condition, where V is the set of males (Alex, Ben, and Chris) and the ws are the freshman rooms (100, 101, 200 and 201), would be satisfied by the following four scenarios. In scenario one, VRoom101 contains {Alex,Ben,Chris}. In scenario two, VRoom100 contains {Alex} and VRoom200 contains {Ben,Chris}. In scenario three, VRoom100 contains {Ben} and VRoom200 contains {Alex,Chris}. In scenario four, VRoom100 contains {Chris} and VRoom200 contains {Ben,Chris}. It is probably easier to see this if looked at it "in reverse" (hence referring to this as a condition in the opposite direction) from the student to the room, where each student lives in either VRoom100, VRoom101, or VRoom200.

A d-deniability condition specifies a et variable V and an integer value for D to specify that each value assigned to V must have at least D cases where it is not assigned to V. For example, a d-deniability condition on VRoom100 with a D of 1, would be satisfied by three scenarios. In scenarios one, VRoom100 contains {Dana} and VRoom200 contains {Eve, Fran}. In graph scenarios, VRoom100 contains {Eve} and VRoom200 contains {Dana,Fran}. In graph scenarios, VRoom100 contains {Fran} and VRoom200 contains {Eve, Fran}. Again, this is probably more easily seen "in reverse" by noting that each student lived in either VRoom100 or VRoom200 and therefore each possible inhabitant of VRoom100 had one case where they did not inhabit room VRoom100.

Synthetic Generation

RandomSAT™, a random satisfiability solver created by the inventor, finds random solutions to constraint problems. The problem of finding solutions to the constraints is provably NP-complete (nondeterministic polynomial time). RandomSAT™ differs from known random satisfiability solvers in that it allows specification of the sampling distribution for each variable in the constraints. Whereas existing random solvers allow selecting a uniformly random variable between a minimum and a maximum, RandomSAT™ allows a range of distributions in addition to uniform.

Figure 19:
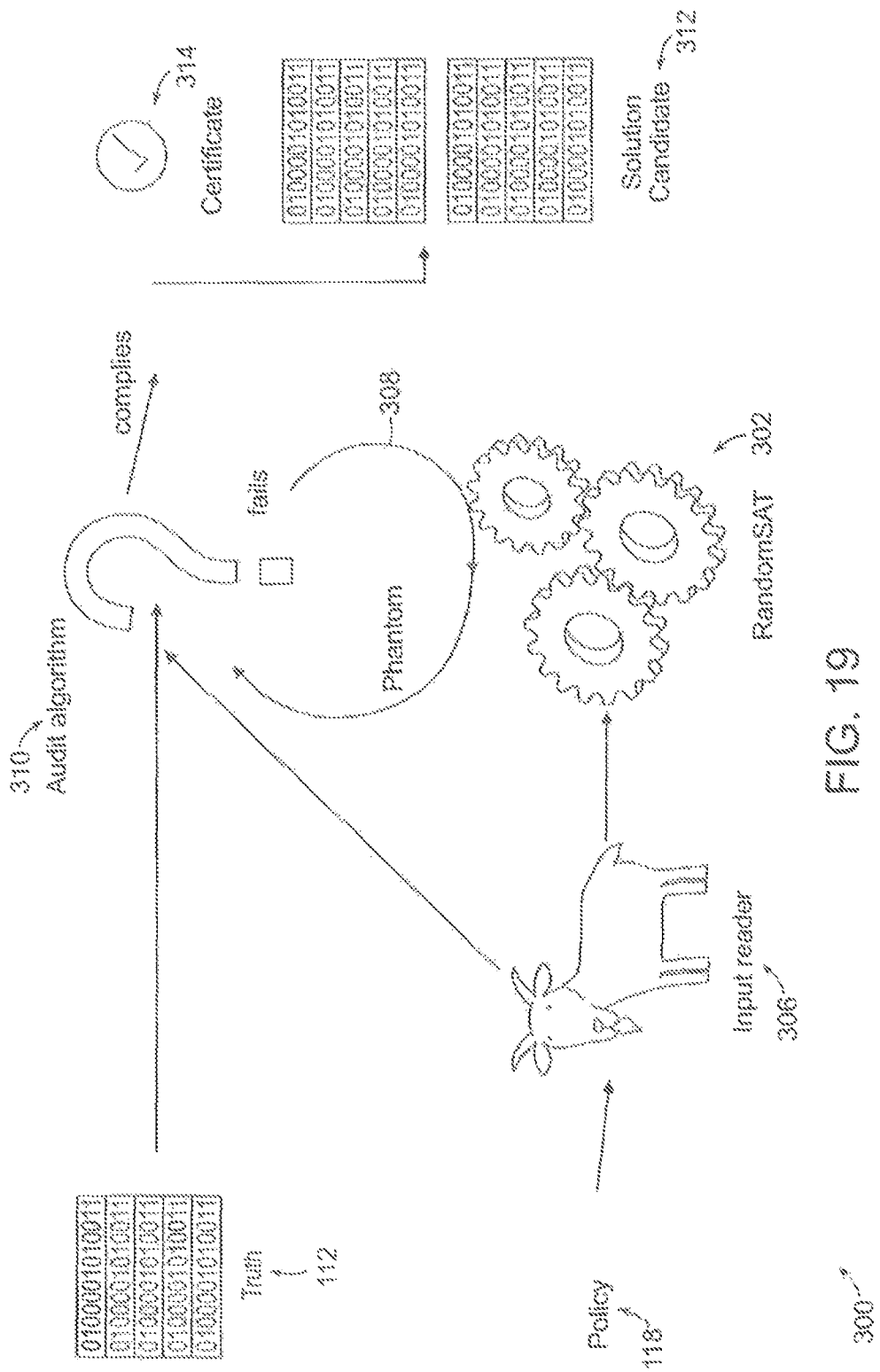
FIG. 19 is an illustration of an example architecture for a selective disclosure of sensitive data system.

Exemplary implementations of the methods and systems described herein use a parser to read the truth data 112, at least one policy 118 as written in the constraint language described herein, invoking RandomSAT™ to generate the synthetic data phantoms 224, and calling to the auditing processor(s) 232 to determine both when to stop generating phantoms 224 and to prove the result complies with the policy 118. An exemplary architecture 300, shown in FIG. 19, may include the RandomSAT™ algorithm 302, a parser input reader 306, to parse and transform policies 118, and a loop 308 that repeatedly invokes RandomSAT™ and an audit stage algorithm 310. The input reader 306 takes in the policy 118 front a file and transforms it into an in-memory representation (not shown). RandomSAT™ 302 takes the policy representation and produces a phantom. The auditing stage algorithm 310 takes a solution candidate 312 (a set of datasets consisting of the truth and the phantoms produced so far) and the policy representation and either produces a certificate of compliance 314 or fails the audit. Upon failure, RandomSAT™ 302 may be invoked to generate an additional phantom. In summary, the solution candidate 312 is seeded with the truth, invokes RandomSAT™ 302 to generate sufficient phantoms for the audit stage algorithm 310 to deem the solution candidate 312 compliant.

With reference to FIG. 24, three points are worth noting for better understanding. First, the maximum size and possible makeup of the universe for the policy and phantom variables is known. Every policy 118 must provide an upper bound on the number of elements each policy variable can represent. While the data objects need not contain all of these, this information means all objects are finite. Second, there are two levels of variables. Constraints contain set variables. These set variables are resolved in two steps. Each set variable represents a set of element variables where each element variable represents a data item—a potential value in the database. Element variables are critical because when resolving a policy, $V_a$ may be known to represent three elements and be disjoint from $V_b$ without yet knowing the identity of the elements Va and Vb represent. Third, each set variable is associated with a distribution description that describes how to select elements to fill the set—for example: uniformly at random, from a normal distribution with certain parameters, etc. A valid assignment is an assignment that adheres to the constraints (i.e., the same meaning of valid defined earlier). This assumption is meant to provide a basis for developing more formalism where the policy writer could specify a distribution.

The input reader 306 parses the policy 118, simplifies the expressions in the policy, transforms the policy into an in-memory policy representation 122, and minimizes the policy by limiting the values the policy expressions represent. A policy is written using the policy language described earlier. After parsing the policy, sub-expressions are replaced with variables. This transformation is called A-normalization. For example, consider the policy in Figure XX?. The expression Va=Ve∩sources(Ey) becomes Va=Ve∩V1 where V1=sources (Ey). Next, the A-normalized policy expressions are transformed and the in-memory policy representation built. Finally, the policy is minimized to eliminate duplicate variables and specify as much information as possible about the variables in the policy.

A straightforward transformation converts the A-normalized policy into the in-memory policy representation 122. Any existing environment and constraints are read, adding the appropriate policy variables to the policy representation 122. For clarification purposes, a brief description of the accounting involved will be provided in the context of the various maps and other information that define the in-memory policy representation 122.

The in-memory representation 122 operates on policy variables, where each policy variable represents a vertex, edge, attribute or label expression (note that a variable is also an expression). There is a collection of associations each of which keeps information about the policy variable as well as some general information about the graph. The associations may be: relationships, membership, names, intersections, unions, element mappings, in degree, out degree. Relationships keep track of how one policy variable is related to another. For example, it identifies the attribute policy variable associated with a vertex policy variable. Membership keeps the information about which element variables the polic variable represents. Names maintains a list of names for each policy variable. Names are used solely for debugging output and final display. Since a single policy variable can participate in multiple unions and intersections, knowing the existence of a union relationship—from the relationships maps—is insufficient. For example, if policy variable Va is the target of union relationships with policy variables Vb, Vc, Vd, and Ve, that information alone is insufficient to determine if that represents one or two unions, and, if it represents two unions, how the variables divide between the unions. Intersection and union maps keep track of this information. Element mappings keep track of known relationships among graph elements. Ins and outs maps keep the in degree and out degree for vertices. In addition to the finite maps, there are three pieces of general information: graph information, glob information, and sufficiencies. The graph information keeps the number of vertices and edges and provides mappings from annotation identifiers to the strings they represent. Glob information tracks the current policy variables that represent "All" policy variables. Sufficiencies are the sufficiency conditions.

The relationships maps maintain an accounting of the relationships among policy variables. Attribute maps relate vertex policy variables and their corresponding attribute policy variables. Edges may have three maps—one each for sources, targets, and labels that relate an edge policy variable to a vertex policy variable, vertex policy variable, and label policy variable respectively. Union, intersection, and subset maps relate between policy variables of the same type—vertex to vertex, edge to edge, attribute to attribute, or label to label.

A policy variable contains membership information including a cardinality range and a division of the graph elements into: includes, excludes and unknowns. A cardinality range may comprise a lower and upper bound. If the two values are the same, the cardinality is exact. Includes are elements that must be included in the set, excludes must be excluded and unknowns are those whose inclusion or exclusion is not yet known. A policy variable is fully specified if the cardinality range specifies the exact cardinality and there are no unknowns; if any of these conditions is not true, the policy variable is partially specified. Any operation that either tightens the cardinality bounds or reduces the number of unknowns further specifies the policy variable.

Keeping track of aggregates (unions and intersection) requires more information than found in the relationships maps, because a policy variable can be described by several union or intersection relationships. Consider a policy variable A that participates in two union relationships, $A=B \cup C$ and $A=D \cup E$.

The relationship maps simply list A as the target of unions whose sources are B, C, D, and E, but that does not represent the entire relationship. Therefore, the system maintains two aggregate maps—one for intersections and one for unions—that associate a list of sets of policy variables for each policy variable, where each set of policy variables represents a single aggregate.

Element mappings keep track of the relationships between element variables—not to confused with the relationships between policy variable. As the system gathers more information about what elements a policy variable represents, it also gathers information about the relationships among its elements. For example, if processing restricts a policy variable to representing exactly one vertex and the associated attribute policy variable represents exactly one vertex, then determining which vertex and attribute the respective policy variables represent also specifies the association between a vertex element and an attribute element. Recording this information saves time later—during the generation stage. It also eliminates certain possibilities. For example, if knowing that the element mappings for a vertex and another policy variable contains that vertex that might instruct more information about the other elements that policy variable represents. The implementation updates and uses element mappings to further restrict the values of various elements.

The policy representation 122 maintains the in and out degree range for each vertex element. These ranges are necessary as they sometimes allow inference about the in or out degree range where otherwise there would be no place to store that information. For example, in the roommate dataset, that specifies the capacity of a room by fixing the cardinality of the edges that egress the room set variable. In the input policy file, the in degree of the room variable is attached to the in edges, not the room. Since there might be several sets of edges that have the same room variable as their target, it is not always obvious where to find the in degree. Keeping track of the in degree also makes it possible to improve performance by dropping some policy variables—such as the edge policy variable that specifies the room capacity. While reading the policy, the implementations build the degree mappings and updates those mapping whenever ranges are constrained.

Graph information describes the universe of graph elements for the policy 118. It records the upper bound on the number of vertices and edges. In addition, there is an attribute directory that enables resolving between attribute policy variables (remember a policy variable is an identifier) and the string that policy variable represents as well as in the reverse direction. Similarly, there is a label directory for resolving between a label policy variable and the string it represents. These directories explicitly define the possible attributes and labels thus implicitly defining the upper bounds on the number of distinct attributes and labels. The system operates on policy variables, but when reading in the truth or writing phantoms to a file, it needs to transform strings to policy variables and policy variables to strings.

Glob information keeps track of which policy variable currently represents each of the "all" policy variables. These policy variables rare referenced repeatedly in the implementation, and it proves faster to keep track of them than to constantly search the membership map to find them. The all policy variables are: AllV, AllE, AllA (technically attrs (AllV)), AllL (technically labels(AllE)), AllSrcs (technically sources(AllE)), AllTgts (technically targets(AllE)), AllSrcsA (technically attrs(sources(AllE))), and AllTgtsA (technically attr(targets(AllE)). The glob information provides a caller a fast way to request an all policy variable by "name".

Sufficiencies are encoded precisely as described in the formalism. Note that the implementation does need to keep them with the policy representation 122 because they occasionally need updating. Any time the system renumbers a policy variable, it needs to reflect that change in the sufficiencies.

Figure 25:
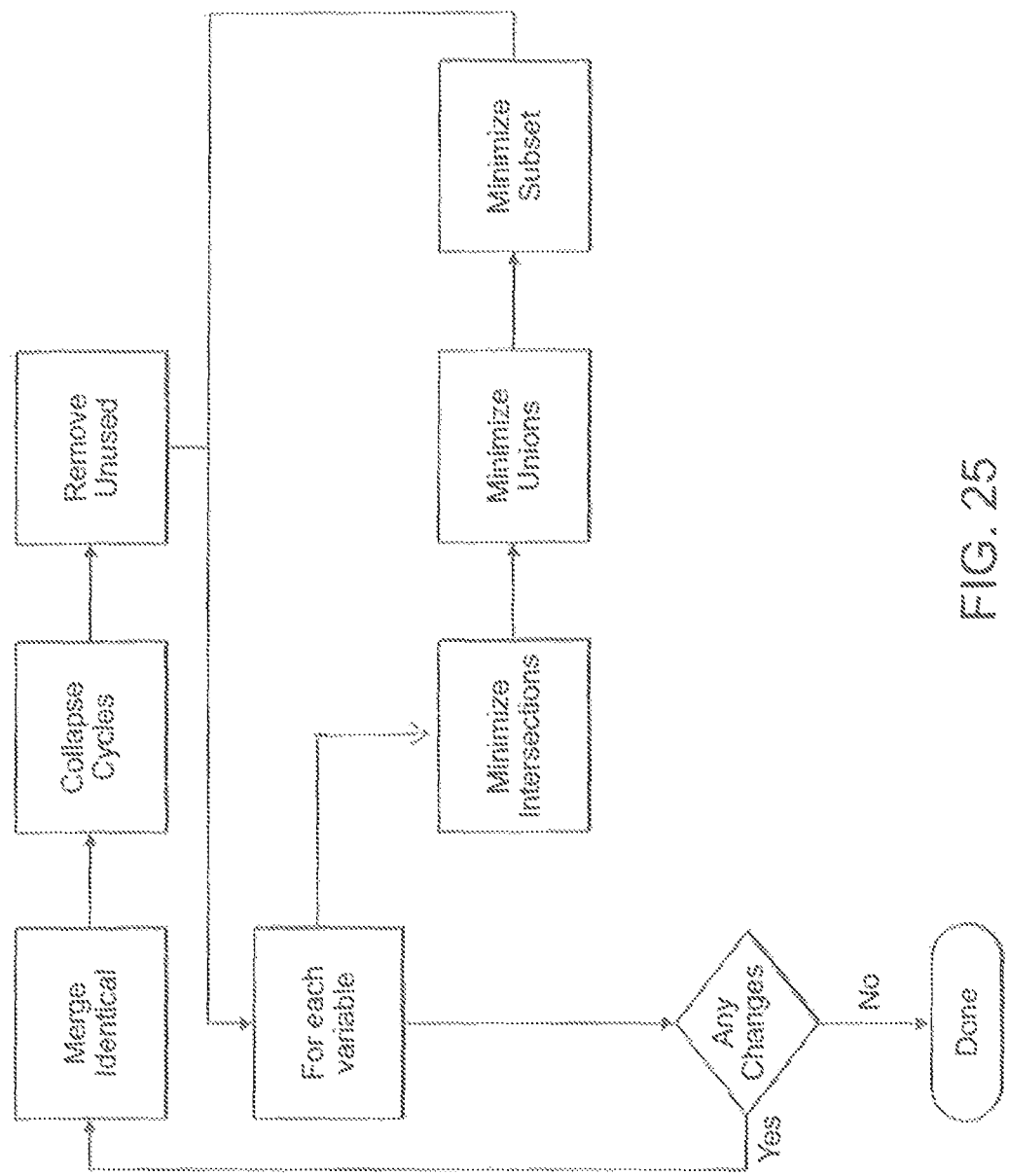
FIG. 25 is a flow diagram illustrating an example policy variable minimization process.

FIG. 25 illustrates a minimization process, which depicts the workflow of an operation performed on policy representation 122 that does two things: first, it removes unneeded policy variables and second, it restricts the values a policy variable can represent. There are at least two ways to reduce the number of policy variables, (a) by removing policy variables that are not connected to any other policy variable and (b) by merging policy variables that must be identical. Restricting the values a policy variable can represent involves tightening the cardinality bounds and/or refining the membership of a policy variable (i.e., the members of includes, excludes, and unknowns). There are transformations performed on each policy variable and others performed on each edge.

Reducing the Number of Policy Variables

In the policy variable reduction step, remove policy variables with no neighbors and merge policy variables that must be identical. A policy variable with degree zero has no neighbors; minimization finds and removes these. Next find and merge policy variables that must be identical. Policy variables are identified as identical by: subset relationships, identifying relationships, or membership. Policy variables that are subsets of each other are also identical because $A \subseteq B$ and $B \subseteq A$ implies $A=B$.

This still holds for larger cycles such as $A \subseteq B$, $B \subseteq C$ and $C \subseteq A$. Some relationships can identify policy variables as identical. For example, if vertex set V is connected by attribute edges to two attribute sets A1 and A2 then $A1=A2$ because a set of vertices specifies a set of attributes. Similarly, a set of labels, sources and targets are completely specified by a set of edges. Note that the converse does not apply because two different sets of vertices can have the same set of attributes—and the same applies to labels, sources and targets. Finally, policy variables that are fully specified and contain the same members must be identical. This leaves four operations to describe: how to find policy variables that are subsets of each other, how to determine if policy variables are identical by relationships, how to determine whether policy variables are fully specified and identical, and how to merge policy variables.

Policy variables that are subsets of each other must be identical, the challenge is finding such sets of policy variables. Policy variables that are subsets of each other form a cycle of subsets in the policy. Note that intersections are a form of subset and unions are a form of superset. To collapse cycles, filter the graph by considering only subset, union and intersection edges, temporarily reverse the direction of union edges, and perform a strongly connected component analysis on the filtered graph. All policy variables in a strongly connected component are identical and can be merged.

Relationships can also identify policy variables as identical. The attributes relationships is one such case because a set of vertices possesses a unique set of attributes, the set of vertices is connected by attrs edges to two distinct attribute policy variables, the two attribute policy variables must be identical. Similarly, a set of edges defines a set of sources, a set of targets and a set of labels.

Regardless as to how policy variables are identified as duplicates, the solution is to merge the duplicate policy variables. Merging a list of policy variables involves: creating a new policy variable, removing internal edges, reattaching edges, computing membership information, replacing references to the policy variables being merged, deleting the old policy variables, and updating sufficiency conditions. All of these steps are straightforward with the exception of computing membership information. Adding a new policy variable is a basic operation on the graph. Removing internal edges is a matter of finding the edges whose sources and targets are both included in the list of policy variables being merged. If one end of the edge is in the list of policy variables being merged, replace that end with the new policy variable. Union and intersection lists in adjacent policy variables might refer to the policy variables being merged leading us to replace those references with a reference to the new policy variable. If a policy variable A contains a union or intersection list consisting of a single policy variable B, then policy variable A and B must be identical and are therefore merged. In addition, references to the policy variables being merged must be replaced in adjacent policy variables. For example, consider merging policy variables A and B to produce AB, in an adjacent policy variable, C=A∪D, the union expression must be updated to C=AB∪D. Deleting the old policy variables is another basic graph operation. Updating the sufficiency conditions refers to replacing any mention of a policy variable being merged with the new policy variable.

The membership information for a merged policy variable combines the information from all the policy variables being merged. The cardinality range is the intersection of all cardinality ranges. The include list is the union of all include lists. The exclude list is the intersection of all exclude lists. The unknown list is whatever remains of the universe not already in the include or exclude list. The union and intersection lists are aggregated over all the policy variables being merged—except for the removal of references to other policy variables in the list. This is safe because A=A∪B∪C implies A=B∪C and the same holds for intersections. If the result of this merge is inconsistent, the merge operation fails.

Restricting the Values a Policy Variable Can Represent

Restricting the values a policy variable can represent involves either tightening the cardinality bounds or further specifying the graph elements the policy variable represents. Processing union, intersection and subset relationships can update both bounds and inclusion. Unions and intersections are processed per policy variable whereas subset relationships are processed per edge. The remaining cases tighten cardinality ranges—and updates inclusion only in cases where changing the cardinality specifies the membership. For example, if a vertex policy variable must contain 1 and 2, does not contain 3 and 4 and the inclusion of 5 and 6 is unknown, then if specifying the cardinality is exactly 2 (thereby excluding 5 and 6) or exactly 4 (thereby including 5 and 6) the entire policy variable becomes fully specified. Of the cardinality cases, edges are the most complex, because an edge policy variable is associated with three other entities: sources, targets and labels. The relationship between a vertex and its attributes is simpler.

FIG. 20 illustrates the update rules for unions. If all three sets are fully specified, verify that the union holds. If both arguments to the union are fully specified, compute the union and the cardinality. If one argument (assume A) and the result X are fully specified, compute the remaining argument B by including any elements in X but not in A and excluding any elements excluded in X. Then update the cardinality so it is bounded by the size of the includes and the sum of the size of the includes and unknowns. If one argument is fully specified (assume A), update B to include elements in the result X but excluded from A and to exclude elements excluded by X. Then update the cardinality so it is bounded by the size of the includes and the sum of the size of the includes and unknowns. If the result X is fully specified, then update A to include elements in the result X but not in B and exclude elements excluded by the result X. Repeat this process for B and then update the cardinality of each policy variable so it is bounded by the size of the includes and the sum of the size of the includes and unknowns. If nothing is fully specified, update all three policy variables based on the rules described in the prior two cases. If in any of the cases something becomes fully specified, apply this entire algorithm again.

FIG. 21 describes the update rules for intersections. If all three sets are fully specified, verify that the intersection holds. If both arguments to the intersection are fully specified, compute the intersection and the cardinality. If one argument (assume A) and the result X are fully specified, compute the remaining argument B by including any elements in the result X and excluding any elements excluded in the result X but included in the other argument B. Then update the cardinality so it is bounded by the size of the includes and the sum of the size of the includes and unknowns. If one argument is fully specified (assume A), update B to include elements in the result X and to exclude elements excluded by the result X but included in the other argument A. Then update the cardinality so it is bounded by the size of the includes and the sum of the size of the includes and unknowns. If the result X is fully specified, then update A to include elements in the result X and exclude elements excluded by the result X but included in the other argument B. Repeat this process for B and then update the cardinality of each policy variable so it is bounded by the size of the includes and the sum of the size of the includes and unknowns. If nothing is fully specified, update all three policy variables based on the rules described in the prior two cases. If in any of the cases something becomes fully specified, apply this entire algorithm again.

FIG. 22 describes the update rules for subset relationships. If both the superset and the subset are fully specified, verify that the subset relationship holds. If the superset is fully specified add its excludes to the subset while removing those excludes from the unknowns. The subset's minimum is adjusted to be consistent with the include set while the maximum is capped by the size of the superset and further adjusted to reflect the new number of unknowns. If the subset is fully specified, add it's includes to the superset while removing those elements from the unknowns. The superstar's minimum cardinality is the largest of: its old minimum, the number of its includes, and the size of the subset. If neither set is fully specified, perform both of the updates just described.

Edges are the most complex of the cardinality cases. FIG. 23 illustrates the cardinality update rules for edge policy variables. The minimum number of sources corresponds to picking the fewest edges with the most targets and labels and is computed as the floor of the minimum number of edges divided by the product of the maximum number of targets and labels. The maximum number of sources corresponds to picking the largest number of edges with the fewest targets and labels and is computed as the ceiling of the maximum number of edges divided by the product of the minimum number of targets and labels. The cases for targets and labels are symmetrical. For edges, compute the product of sources, targets and labels. To compute the minimum number of edges multiply the number of sources, targets and labels and for the maximum multiply the maximums.

Vertices and attributes are simpler because there are only two sets involved and a set of vertices uniquely identifies a set of attributes. Remember that many vertices can share the same attribute and that each vertex has exactly one attribute. If either set is empty the other set must also be empty. Consider the remaining cases where neither set is empty. Each vertex must have exactly one attribute but all the vertices could have the same attribute. Attributes provide a lower bound but not an upper bound on the number of vertices. There must be at least as many vertices as attributes for those vertices. No information is learned about the upper bounds of either vertices or attributes.

Matching

Matching applications refer to identifying whether entries in different databases refer to the same thing. Consider a case where two parties A and B each have a database—A1 and B1 respectively. For each entry in A1, A wants to know if that entry also appears in B1. Since the databases often contain different fields, determining whether two entries match is not always straightforward. For example, if one database has name, city and date of birth and the second has social security number, gender, and place of birth the identification of matches need not be simple. As a result, assume some match condition M that given an entry from each database reports true if the entries match and false otherwise. The match condition might be provide by B, agreement between the parties, or even some third party C. One application of matching occurs during merger and acquisition discussions, where the merging entities might want to know the extent to which their customers overlap. They cannot do this explicitly, because if the merger falls through it would be revealing critical competitive information—and may violate anti-trust laws. Similarly, before advertising and advertiser would likely want to know if there target is an existing customer. In some cases, the target might be an individual whereas in others it might be an audience. In either case, the advertiser would want to know the likelihood that the individual (or audience) they are targeting is already a customer. The invention described herein can accomplish this goal while limiting the shared information. It is also possible to combine matching with the general data sharing capabilities described earlier to share defined portions of the data that matches (and/or does not match).

There are two methods depending on what the parties agree to share. In the centralized data method, the parties agree to share the data and matching algorithm under the condition that each party's data is not shared with the other party. So none of party A's data is shared with party B and vice versa with the exception of whether a match exists. This can be amended to allow partial sharing by combining with the data sharing example above. Each party receives a proof in the form of a certificate that their information was not shared. Under the authenticity function method, the matching process itself can remain secret.

Centralized Data Method

Figure 26A:
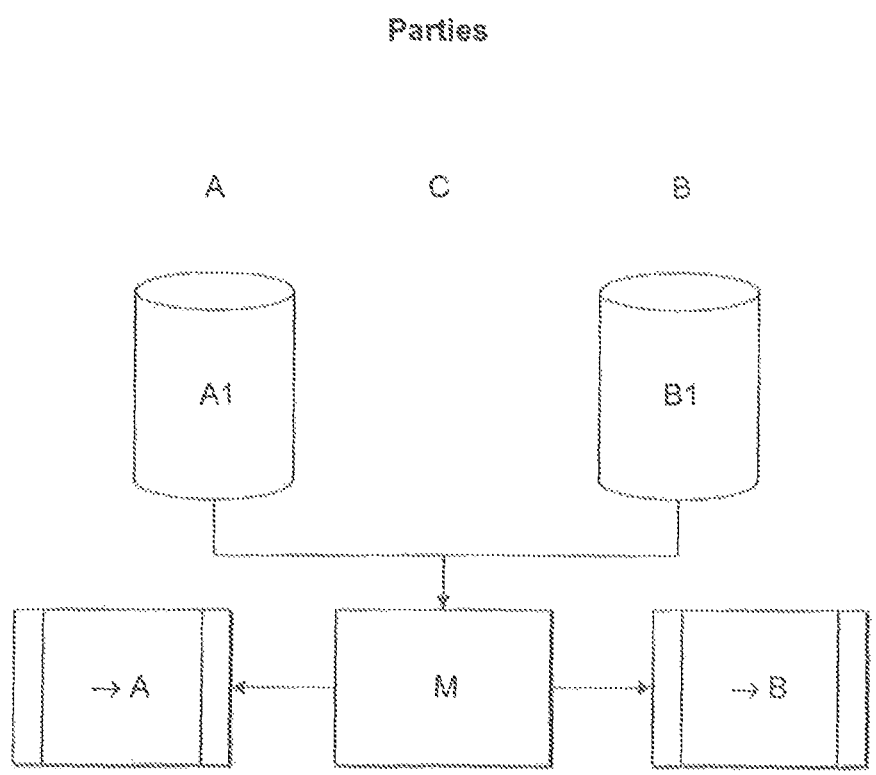
FIGS. 26A,26B are illustrations of centralized data matching and authenticity checking methods.

With reference to FIG. 26A, in the centralized method, the parties (A and B with databases A1 and B1 respectively) agree to share their information and agree on a location where the data sharing will be done (this could be at party A, B or with some third party C). The options as to what party provides the matching criteria include: A, B, in agreement between the two or some party C. Without loss of generality, assume that party A provides the matching criteria M. Both parties securely transfer their data to the sharing location. Recall that the matching procedure is provided by an entry from A1 and an entry from B1 and responds true if and only if it determines that A1 and B1 constitute a match. Then, using the sharing infrastructure described earlier, the data flowing to A (if any) is enforced to include A1 plus the information as to whether there is a match and includes a proof of compliance. Similarly, the data flowing to B (if any) is enforced to include B1 plus the information as to whether there is a match and includes a proof of compliance.

Authenticity Check Method

Figure 26B:
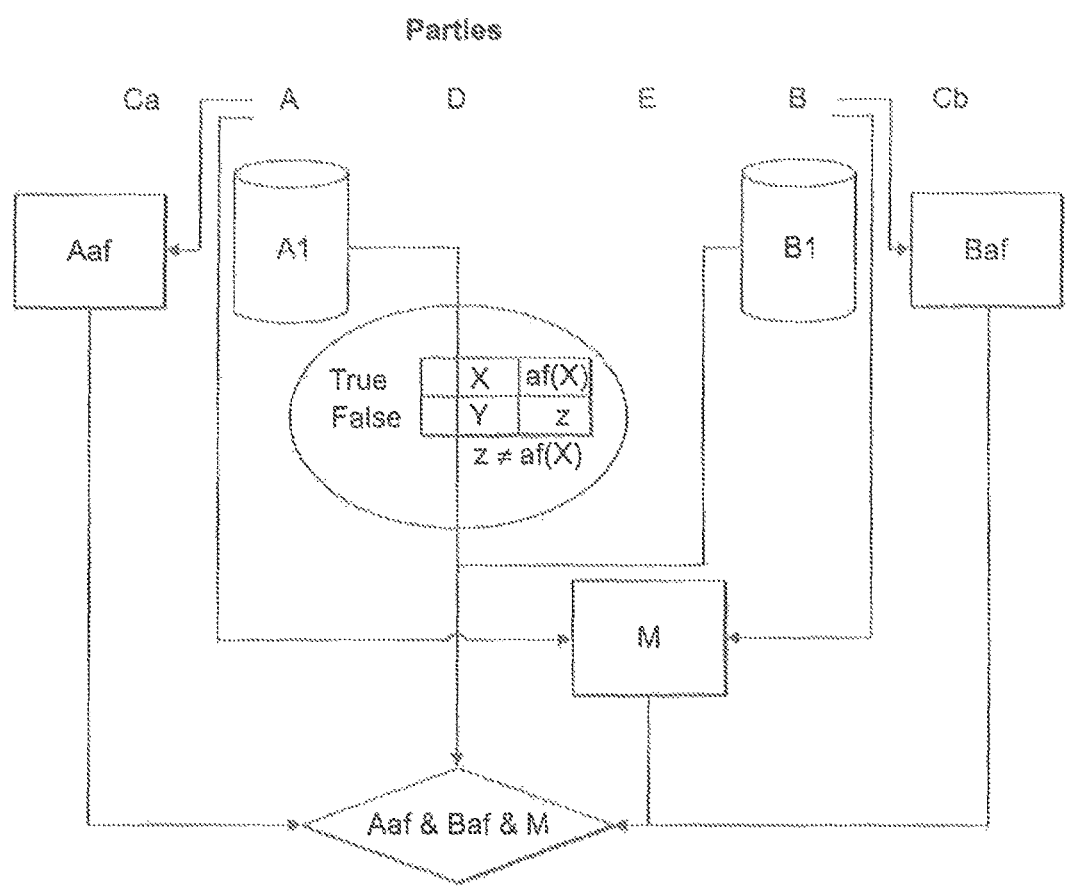

With reference to FIG. 26B, in the authenticity check method, the parties (A and B with databases A1 and B1 respectively) perform the match using an authenticity check. Each party creates an authenticity function which given a data entry produces an authenticity code. Given the same data the authenticity function must always produce the same value. The parties do agree to have a third parties Ca and Cb (optionally both the same party C) keep their authenticity functions and each provides their authenticity function (Aaf and Baf respectively) to Ca and Cb respectively. Then each party creates real and fictitious data and appends authenticity codes to the real data and values that are not valid authenticity codes to the fictitious data. Both parties share the superset consisting of the data and the fake data. This sharing can occur at party A, B, Ca, Cb, or even at party D. They then provide the matching function to party E (which could optionally be one of the previously identified parties). A match occurs if Ca reports the data is authentic and Cb reports the data is authentic and party E reports a match. Again this can be combined with the data sharing method described earlier to allow increased sharing (beyond match no match) and/or to create certificates to prove information shared adheres to agreements. (See "Chaffing and Winnowing: Confidential without Encryption", Ronald Rivest, Mar. 18, 1998.)

Selection Criteria

Figure 27A:
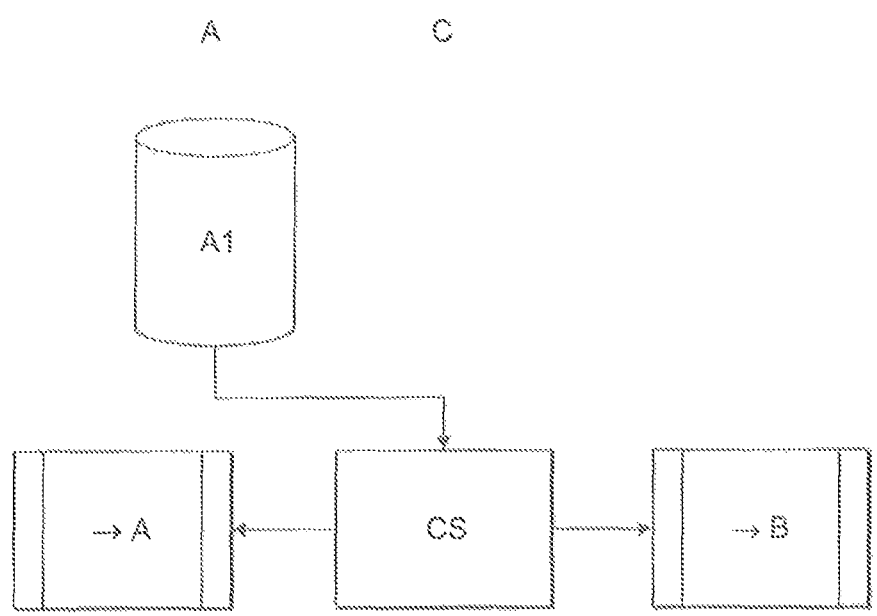
FIGS. 27A,27B are illustrations of criteria selection and authenticity methods.
Figure 27B:
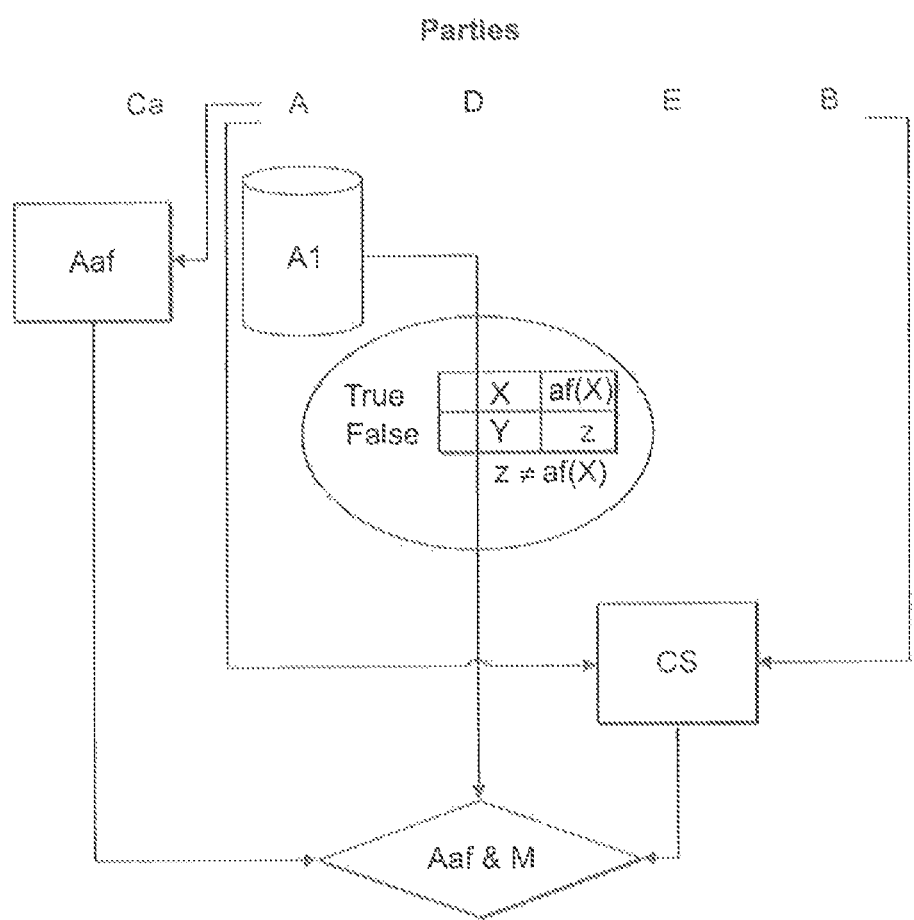

With reference to FIGS. 27A and 27B, selection criteria scenarios refer to cases where party A holds a collection of data in database A1 and party B wants to select a portion of the data in A1. A does not want to share all the information in A1 with B and B does not want to provide A the selection criteria. For example, consider a pharmaceutical company that wishes to identify people between twenty and twenty-five who are obese and on anti-depressants. Hospitals have this data but may not wish to share it either due to lack of patient consent or for a variety of other reasons.

Each of the schemes just described for matching can also apply for selection criteria. In fact this is a degenerate case of matching where one party has no information to share and the matching function's response depends on the data from only one party. Recall that a matching function receives an entry from A1 and B1 and evaluates to true to signify a match and reports false otherwise. A selection criteria function is a matching function that ignores one of its arguments. All the rest proceeds as in each of the cases described for matching.

Recombination

Recombination refers to combining datasets to gather additional information. Just as this invention can be used to share information, it can also be used to combine disparate datasets to re-identify protected data or make inferences through data combination. To use it for this purpose, the goal is to find cases where the invention cannot find a witness. Recall that witness searches are exhaustive, so if finding a witness fails there is no way to comply with the validity portion of the policy. Using the invention to combine data relies on encoding one or more datasets into the policy and then searching for witnesses for an additional policy. The set of witnesses constitute the set of possibilities.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. For example, marketers want to target messages to their audiences and know details such as if their target is already a customer without violating privacy standards. Competitors often find reasons to collaborate yet want to avoid violating anti-trust laws or harming their competitive advantage. This is especially true in mergers and acquisitions where the potential target nm find itself competing with the potential acquirer if the acquisition does not occur. The target would want to make sure not to disclose information unnecessarily. For example, determining the degree of overlap in customers without identifying the customers would be a potential application of matching. Other uses of data rooms such as sharing among government agencies could also be expedited and enriched. More generally the speed, auditability and richness of data this enables enhances opportunities for all sorts of business partnerships including in regulated or in relationships that lack trust. This includes among governments or government agencies. Examples in government include more effective airline screening that leverages sharing of additional information by airlines and/or passengers in ways that preserve privacy. Operational data such as pharmacy or other stock information is often shared up and down the supply chain, in addition to operational uses, this information is often also useful for marketing, competitive and partnership reasons yet sharing is often prevented by regulations, competitive risk and lack of trust. Partial sharing may allow more uses in a legal way without requiring the trust relationship. Researchers could advance science by mining data or looking for potential trial candidates using criteria selection or sufficiently protected data. Medical records could see increased sharing, research and even operational issues such as matching patients across their various providers could all benefit from more controlled data sharing. Students could use tools that leverage experiences to improve education without fear of losing their privacy. Parties could avoid sending, receiving or storing sensitive information by extracting the information they while detoxifying the information by making it no longer personally identifying. This could both reduce liability and provide avenues for new services and insights. Inspected entities could demonstrate compliance without fearing that their auditors might walk away with valuable secrets.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open ended terms. Further, the phrase "based on" is intended to mean "based, at least in part, on" unless explicitly stated otherwise.

Headings used herein are intended as aids for readability and should not be used to interpret or construe aspects of the technology or claims. Although dependent claim listed below may directly depend on only one claim, the disclosure of possible implementations includes each dependent claim in combination with every other claim in the claim set.

The invention claimed is:

1. A computer-implemented method of ensuring selective disclosure of sensitive data, comprising the steps performed by one or more processors of:
  receiving at least one policy comprised of policy variables indicating what data items are sensitive, what data items are disclosable, validity conditions for a candidate disclosure dataset to be believable by a recipient, and sufficiency conditions specifying an extent of variability necessary among data objects in a candidate disclosure dataset to protect the sensitive data, and optionally one or more sets of truth data items;
  if one or more sets of truth data items were received, auditing the one or more sets of truth data items for compliance with the at least one policy, and if the one or more sets of truth data items fails to comply with the at least one policy, or if no sets of truth data items were received, producing a collection of synthetic dataset disclosure possibilities meeting the validity conditions;
  if any synthetic dataset disclosure possibilities are produced, producing one or more associations among the policy variables and each of the one or more sets of truth data items, if any received, and each of the synthetic dataset disclosure possibilities meeting the validity conditions;

if one or more sets of truth data items were received and any synthetic dataset disclosure possibilities produced, generating at least one candidate disclosure dataset comprising at least one of the sets of truth data items and at least one of the synthetic datasets disclosure possibilities; and repeating the producing steps and the generating step until the at least one candidate disclosure dataset whose associations meet the validity conditions, meets the sufficiency conditions or until a determination is made that the sufficiency conditions cannot be met;

storing or transmitting on a tangible medium data associated with the at least one candidate disclosure dataset resulting from the repeated producing and generating steps; and at least one of generating an output indicating a compliance status with respect to the at least one policy, generating a certificate indicating that the at least one candidate disclosure dataset complies with the at least one policy, or providing the at least one compliant candidate disclosure dataset to a recipient, or requesting approval from a holder of the sensitive data to disclose the at least one compliant candidate disclosure dataset, or if the at least one candidate disclosure dataset is determined not to comply with the at least one policy, attempting to modifying the at least one candidate disclosure dataset to be compliant with the at least one policy.

2. The method of claim 1, wherein if the sufficiency conditions or validity conditions are not met, the optionally producing step comprises iteratively adding a synthetic dataset disclosure possibility to the collection.

3. The method of claim 1, wherein the at least one processor produces the one or more associations in a random manner or in parallel.

4. The method of claim 1, wherein the one or more processors optimize at least one of the policy or the one or more truth data sets.

5. The method of claim 1, wherein the one or more processors produce the collection of synthetic dataset disclosure possibilities by assigning to the policy variables values that adhere to at least one selection of a distribution function and a cardinality.

6. The method of claim 1, wherein the respective values of the collection of synthetic dataset disclosure possibilities disagree by at least the extent specified in the sufficiency conditions.

7. The method of claim 1, wherein:
the at least one policy comprises a plurality of policies representing dissimilar requirements with respect to providing and protecting sensitive data; and
the one or more processors reconcile the dissimilar requirements.

8. A computer-implemented method of ensuring selective disclosure of sensitive data, comprising the steps performed by one or more processors of:
receiving at least one policy comprised of policy variables indicating what data items are sensitive, what data items are disclosable, validity conditions for a candidate disclosure dataset to be believable by a recipient, and sufficiency conditions specifying an extent of variability necessary among data objects in a candidate disclosure dataset to protect the sensitive data, and one or more sets of truth data items;
auditing the one or more sets of truth data items for compliance with the at least one policy, and if the one or more sets of truth data items fails to comply with the at least one policy, producing a collection of synthetic dataset disclosure possibilities meeting the validity conditions;
if any synthetic dataset disclosure possibilities are produced, producing one or more associations between the policy variables and each of the synthetic dataset disclosure possibilities meeting the validity conditions;
if any synthetic dataset disclosure possibilities are produced, generating at least one candidate disclosure dataset comprising at least one of the synthetic datasets disclosure possibilities, wherein the at least one candidate disclosure dataset is constrained so as to not include the one or more sets of truth data items; and
repeating the producing steps and the generating step until the at least one candidate disclosure dataset whose associations meet the validity conditions, meets the sufficiency conditions or until a determination is made that the sufficiency conditions cannot be met;
storing or transmitting on a tangible medium data associated with the at least one candidate disclosure dataset resulting from the repeated producing and generating steps; and
if the at least one candidate disclosure dataset is determined to comply with the at least one policy, performing at least one of generating an output indicating a compliance status with respect to the at least one policy, or generating a certificate indicating that the at least one candidate disclosure dataset complies with the at least one policy, or providing the at least one compliant candidate disclosure dataset to a recipient, or requesting approval from a holder of the sensitive data to disclose the at least one complaint candidate disclosure dataset, or if the at least one candidate disclosure dataset is determined not to comply with the at least one policy, attempting to modify the at least one candidate disclosure dataset to be compliant with the at least one policy.

9. A computer-implemented method of auditing for compliance to at least one policy a set of previously instantiated datasets of selectively disclosable sensitive data, comprising the steps performed by one or more processors of:
receiving
at least one policy comprised of policy variables indicating what data items are sensitive, what data items are disclosable, validity conditions for a candidate disclosure dataset to be believable by a recipient, and sufficiency conditions specifying an extent of variability necessary among data objects in a candidate disclosure dataset to protect the sensitive data, and
at least one candidate disclosure dataset;
determining whether the at least one candidate disclosure dataset complies with the validity conditions, and generating one or more associations between the policy variables and the one or more truth data sets and the synthetic dataset disclosure set possibilities meeting the validity conditions;
determining whether the at least one candidate disclosure dataset whose associations meet the validity conditions, meets the sufficiency conditions; and
storing or transmitting on a tangible medium data associated with the at least one candidate disclosure dataset resulting from the generating step(s); and
if the at least one candidate disclosure dataset is determined to comply with the at least one policy, performing at least one of generating an output indicating a compliance status with respect to the at least one policy, or generating a certificate indicating that the at least one candidate disclosure dataset complies with the at least one policy, or providing the at least one compliant candidate disclosure dataset to a recipient, or requesting approval from a holder of the sensitive data to disclose the at least one compliant candidate disclosure dataset, or if the at least one candidate disclosure dataset is determined not to comply with the at least one policy, attempting to modifying the at least one candidate disclosure dataset to be compliant with the at least one policy.

10. A computer-implemented system for matching sensitive truth datasets, comprising:
at least one processor configured to:
store in memory a corresponding first and second dataset each including one or more truth datasets comprised of truth dataset elements for one or more data fields;
expand the first and second datasets to include one or more fictitious dataset elements for the one or more data fields;
generate for and associate to each truth dataset element and fictitious dataset element an associated authenticity code using corresponding first and second authenticity functions, wherein each authenticity function produces for each truth dataset element a consistent authenticity code for a given dataset element input to the authenticity function that is distinct from authenticity codes produced for fictitious dataset elements;
share with a matching unit the expanded first and second datasets with the generated associated authenticity codes, a matching function, and
the first and second authenticity functions;
cause the matching unit to
apply to the shared extended first and second datasets the matching function in order to determine at least one indication of the likelihood of a match occurrence between elements of the shared expanded first and second datasets, and
verify using the shared first and second authenticity functions the shared associated authenticity codes to generate at least one authenticity determination related to the shared expanded first and second datasets;
determine whether one or more authentic truth dataset matches have occurred based on correspondence between the at least one indication of the likelihood of a match and the at least one authenticity determination; and
store or transmit on a tangible medium data associated with the truth dataset match determination, and
if no authentic truth dataset matches are determined to have occurred, generating an output including at least one of an indication that no truth dataset match was found, an indication of a proximity to a truth dataset match, or characteristic information regarding the first and second datasets, and
if at least one authentic truth dataset match is determined to have occurred, generating an output including at least one of a report of the existence of an authentic truth dataset match, a count of the number of authentic truth dataset matches, an approximate number of authentic truth dataset matches, an indication of duplicate dataset entries, an aggregation of the matching criteria and truth dataset entries, a computed value for a data field entry associated with the authentic truth dataset match, an indication of which truth datasets did not match, an indication of a proximity to additional authentic truth dataset matches, and/or at least one portion of a matching authentic truth dataset.

11. The computer-implemented system of claim 10, wherein the likelihood of a match output by the matching function comprises a true indication, a false indication, or a score.

12. A computer-implemented system for defining and implementing selecting criteria for sensitive data disclosure, comprising:
at least one processor configured to:
store in memory a dataset including one or more truth dataset elements for corresponding one or more data fields, and an authenticity function;
expand the dataset to include one or more fictitious dataset elements for the one or more data fields;
generate for and associate to each truth dataset element and fictitious dataset element an authenticity code using the authenticity function, wherein the authenticity function produces for a particular truth dataset elements a consistent authenticity code for a given dataset element input to the authenticity function that is distinct from authenticity codes produced for the fictitious dataset elements;
share with a matching unit the expanded dataset with or without the associated authenticity codes;
if the associated authenticity codes are shared with the matching unit, share the authenticity function with the matching unit, otherwise share with an authenticity unit the authenticity function;
receive at the matching unit selecting criteria specifying values to evaluate a predicate of the data fields of the shared expanded dataset;
cause the matching unit to apply the selecting criteria to the one or more shared expanded dataset elements, and generate an indication of a likelihood of a match occurrence between the selecting criteria and data field entries in the shared expanded dataset;
cause the matching unit or the authenticity unit, depending on which has been shared the authenticity function, to verify using the authenticity function at least the authentication codes associated with the shared expanded dataset elements for which the matching unit has generated a likelihood of a match occurrence, in order to identify truth dataset element authentication codes;
determine whether one or more authentic truth dataset match has occurred by identifying the indications of likelihood of a match between the selecting criteria and data field entries in the shared expanded dataset that correspond to truth dataset element authentication codes; and
store or transmit on a tangible medium data associated with the authentic truth dataset match determination, further comprising
if no authentic truth dataset matches are determined to have occurred, generating at least one output including an indication that no truth dataset match was found, an indication of a proximity to a truth dataset match, or characteristic information regarding the truth datasets, and
if at least one authentic truth dataset match is determined to have occurred, generating an output including at least one of a report of the existence of a truth dataset match, a count of the number of truth dataset matches, an approximate number of truth dataset matches, an indication of which truth datasets did not match, an indication of a proximity to additional truth dataset matches, and/or at least one portion of a matching truth dataset.

13. The computer-implemented system of claim 12, wherein the at least one processor is further configured to receive the selecting criteria from a querying entity.

14. The computer-implemented system of claim 12, wherein the at least one processor is further configured to output at least one of an aggregation of the matching criteria and entries, a computed value for a data field entry associated with the authentic truth dataset match, and an indication of duplicate entries.

15. A computer-implemented method for recombining datasets to re-identify unprotected truth data, comprising the steps performed by at least one processor of:
   receiving a plurality of disclosed datasets, at least an indeterminate one of the disclosed datasets including protected truth data formed from the unprotected truth data by transformation;
   using at least one of the disclosed datasets, constructing at least one description of a set of unprotected truth data possibilities for unprotected truth data items in said plurality of disclosed datasets;
   determining whether one or more datasets of the plurality that was not used in constructing the at least one description of the set of unprotected truth data possibilities satisfies the at least one description; and
   forming an inference regarding the unprotected truth data possibilities based on the one or more satisfaction determination; and
   storing or transmitting on a tangible medium data associated with the unprotected truth data possibilities inference, further comprising
      if one or more datasets not used in constructing the at least one description fails to satisfy the description, generating an output including at least one of an indication of an inability to re-identify the unprotected truth data, and a indication of a proximity to satisfying the description, and
      if the one or more datasets not used in constructing the at least one description satisfies the description, generating an output reporting at least one of the ability to re-identify the unprotected truth data, at least a portion of the unprotected truth data items re-identified by inference to comprise the initially disclosed truth data based on satisfying the at least one description, a measure of an extent of refinement of unprotected truth data possible from the protected truth data, an indication of a proximity to additional dataset matches satisfying the description, and an indication of refinements possible of unprotected truth data possible from the protected truth data.

16. The method of claim 15, further comprising interpreting for output the at least one description that is satisfied by each of the disclosed datasets in the plurality of disclosed datasets.

17. A computer-implemented system for matching sensitive truth datasets, comprising:
   at least one processor configured to:
   store in memory a corresponding first and second dataset each including one or more truth datasets comprised of truth dataset elements for one or more data fields;
   expand the first and second datasets to include one or more fictitious dataset elements for the one or more data fields;
   generate for and associate to each truth dataset element and fictitious dataset element an associated authenticity code using at least one authenticity function, wherein each authenticity function produces for each truth dataset element a consistent authenticity code for a given dataset element input to the authenticity function that is distinct from authenticity codes produced for fictitious dataset elements, wherein the authenticity function producing authenticity codes for the first dataset may be distinct from the authenticity function producing authenticity codes for the second dataset;
   share with a matching unit the expanded first and second datasets and a matching function;
   share with at least one authenticity unit the expanded first and second datasets with associated authenticity codes, and the corresponding at least one authenticity function;
   cause the matching unit to apply to the shared expanded first and second datasets a matching function and output as a result of the matching function application at least one indication of the likelihood of a match occurrence between elements of the shared expanded first and second datasets;
   cause the at least one authenticity unit to apply the corresponding first at least one authenticity function to the shared expanded first and second datasets with associated authenticity codes to output at least one authenticity determination;
   determine whether one or more authentic truth dataset matches have occurred based on correspondence between the at least one indication of the likelihood of a match and the at least one authenticity determination; and
   store or transmit on a tangible medium data associated with the truth dataset match determination, further comprising
      if no authentic truth dataset matches are determined to have occurred, generating an output including at least one of an indication that no authentic truth dataset match was found, an indication of a proximity to an authentic truth dataset match, or characteristic information regarding the first and second datasets, and
      if at least one authentic truth dataset match is determined to have occurred, generating an output including at least one of a report of the existence of an authentic truth dataset match, a count of the number of authentic truth dataset matches, an approximate number of authentic truth dataset matches, an indication of duplicate dataset entries, an aggregation of the matching criteria and truth dataset entries, a computed value for a data field entry associated with the authentic truth dataset match, an indication of which truth datasets did not match, an indication of a proximity to additional authentic truth dataset matches, and at least one portion of a matching authentic truth dataset.

18. The computer-implemented system of claim 17, wherein the likelihood of a match output by the matching function comprises a true indication, a false indication, or a score.

* * * * *